United States Patent
Kawabe et al.

(10) Patent No.: US 11,335,366 B2
(45) Date of Patent: May 17, 2022

(54) MAGNETIC DISK DEVICE AND READ PROCESSING METHOD

(71) Applicants: Kabushiki Kaisha Toshiba, Tokyo (JP); Toshiba Electronic Devices & Storage Corporation, Tokyo (JP)

(72) Inventors: Takayuki Kawabe, Sagamihara Kanagawa (JP); Daisuke Sudo, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/183,529

(22) Filed: Feb. 24, 2021

(65) Prior Publication Data

US 2021/0398559 A1    Dec. 23, 2021

(30) Foreign Application Priority Data

Jun. 23, 2020 (JP) .............................. JP2020-107840

(51) Int. Cl.
- *G11B 27/36* (2006.01)
- *G11B 5/54* (2006.01)
- *G11B 5/55* (2006.01)
- *G11B 20/12* (2006.01)

(52) U.S. Cl.
CPC ........ *G11B 5/5547* (2013.01); *G11B 20/1217* (2013.01); *G11B 2020/1232* (2013.01)

(58) Field of Classification Search
CPC .. G11B 5/012; G11B 5/09; G11B 5/00; G11B 27/36; G11B 5/58; G11B 5/59633; G11B 5/59638; G11B 5/035; G11B 5/5526; G11B 5/82; G11B 2220/2516; G11B 5/59655; G11B 5/54; G11B 15/4676
USPC ................................................ 360/75, 77.07
See application file for complete search history.

(56) References Cited

U.S. PATENT DOCUMENTS

| | | |
|---|---|---|
| 5,251,194 A | 10/1993 | Yoshimoto et al. |
| 7,675,700 B2 | 3/2010 | Takeda et al. |
| 8,885,284 B2 | 11/2014 | Kashiwagi et al. |
| 8,896,961 B1 | 11/2014 | Harllee, III |
| 9,378,763 B1 | 6/2016 | Kim et al. |
| 9,378,963 B2 | 6/2016 | Yeh |
| 9,875,763 B1 | 1/2018 | Jury et al. |
| 10,192,570 B2 * | 1/2019 | Kawabe ................ G11B 5/09 |
| 2019/0362752 A1 | 11/2019 | Kawabe |

FOREIGN PATENT DOCUMENTS

| JP | 2007-115324 A | 5/2007 |
|---|---|---|
| JP | 2014-89780 A | 5/2014 |
| JP | 2019-204566 A | 11/2019 |

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a disk including a first sector arranged at a first radial position deviated from a target position in a radial direction by a first offset amount larger than a first threshold value, a head that writes data to the disk and reads data from the disk, and a controller that reads the first sector by arranging the head at a second radial position deviated from the target position by a second offset amount different from the first offset amount.

18 Claims, 17 Drawing Sheets

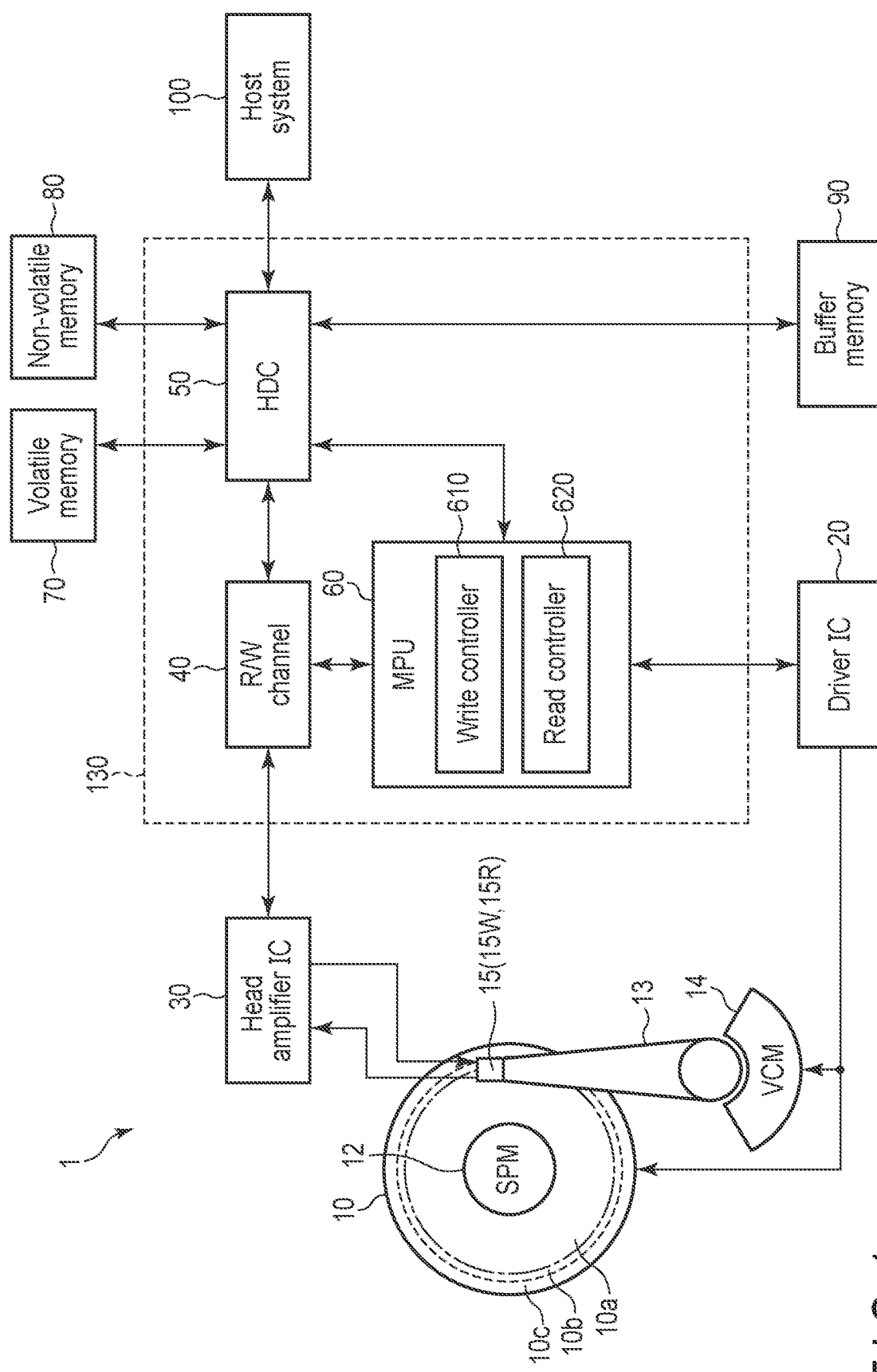
F I G. 1

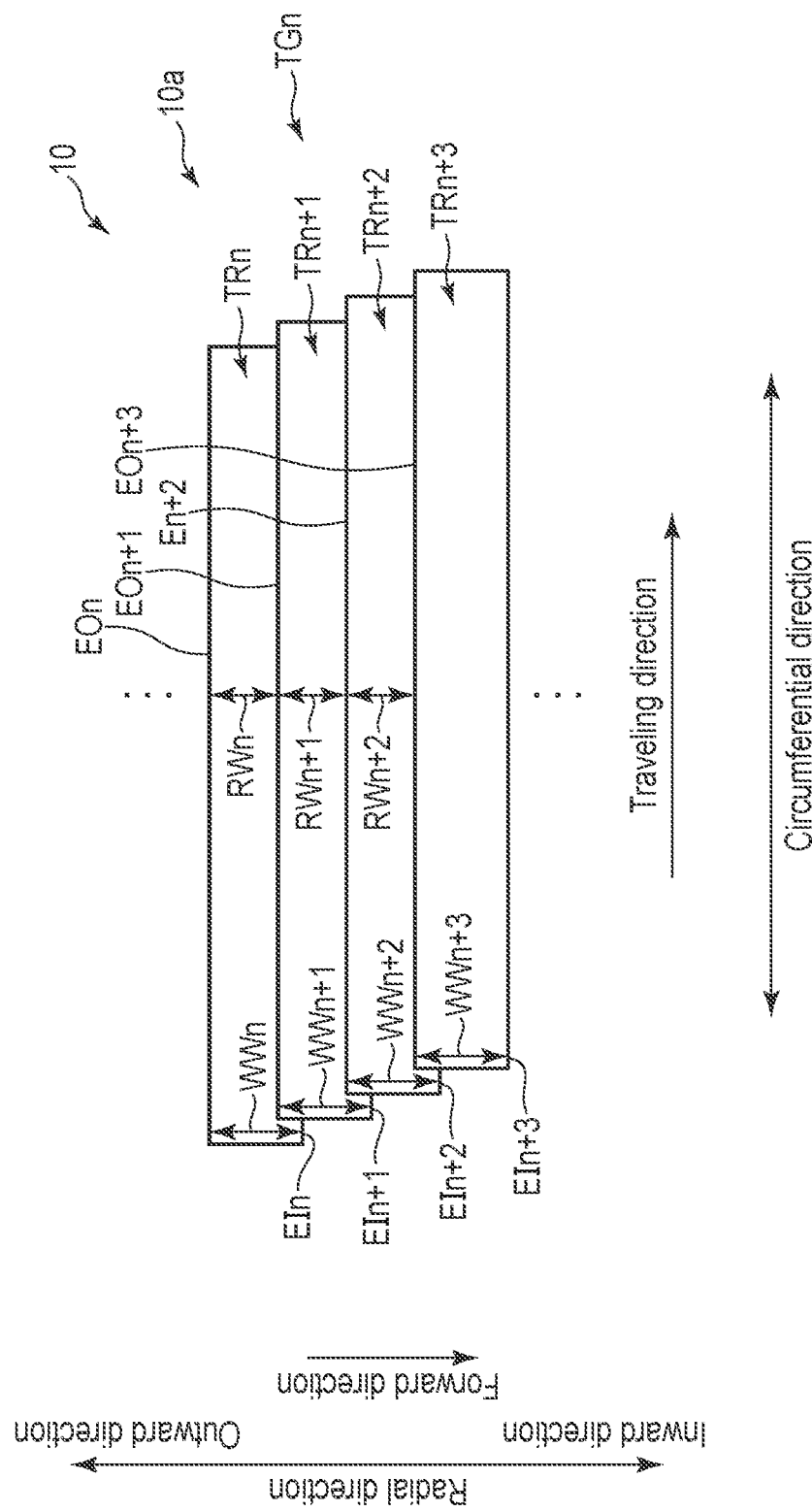
F I G. 3

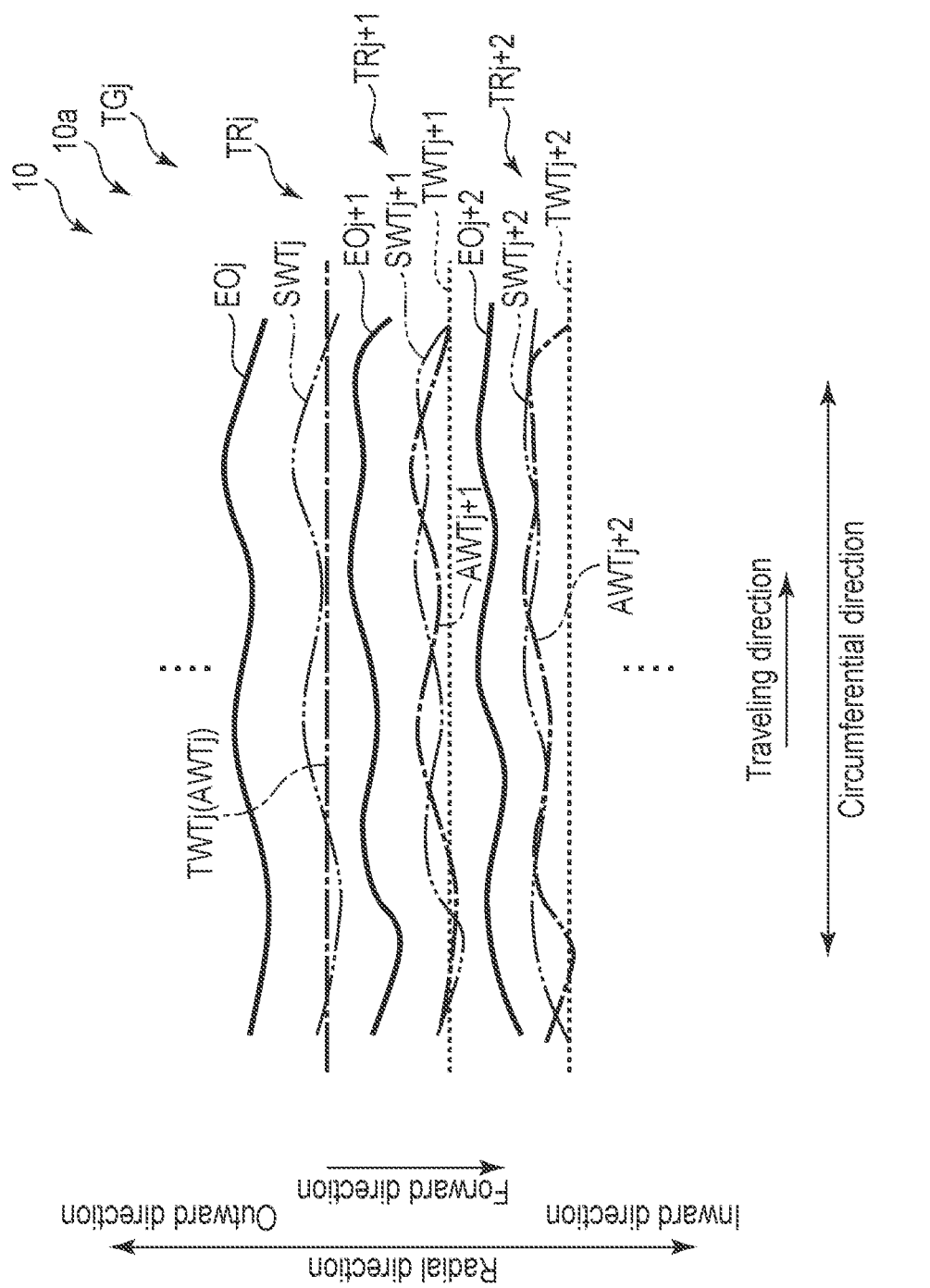
F I G. 5

| Head | Cylinder (track) | Correction sector | Correction read offset amount (X4) |
|---|---|---|---|
| H0 | Cyla | Sca | Ofa |
| H0 | Cylb | Scb | Ofb |
| ⋮ | ⋮ | ⋮ | ⋮ |
| H1 | Cylc | Scc | Ofc |
| ⋮ | ⋮ | ⋮ | ⋮ |
| Hn | Cyln | Scn | Ofn |

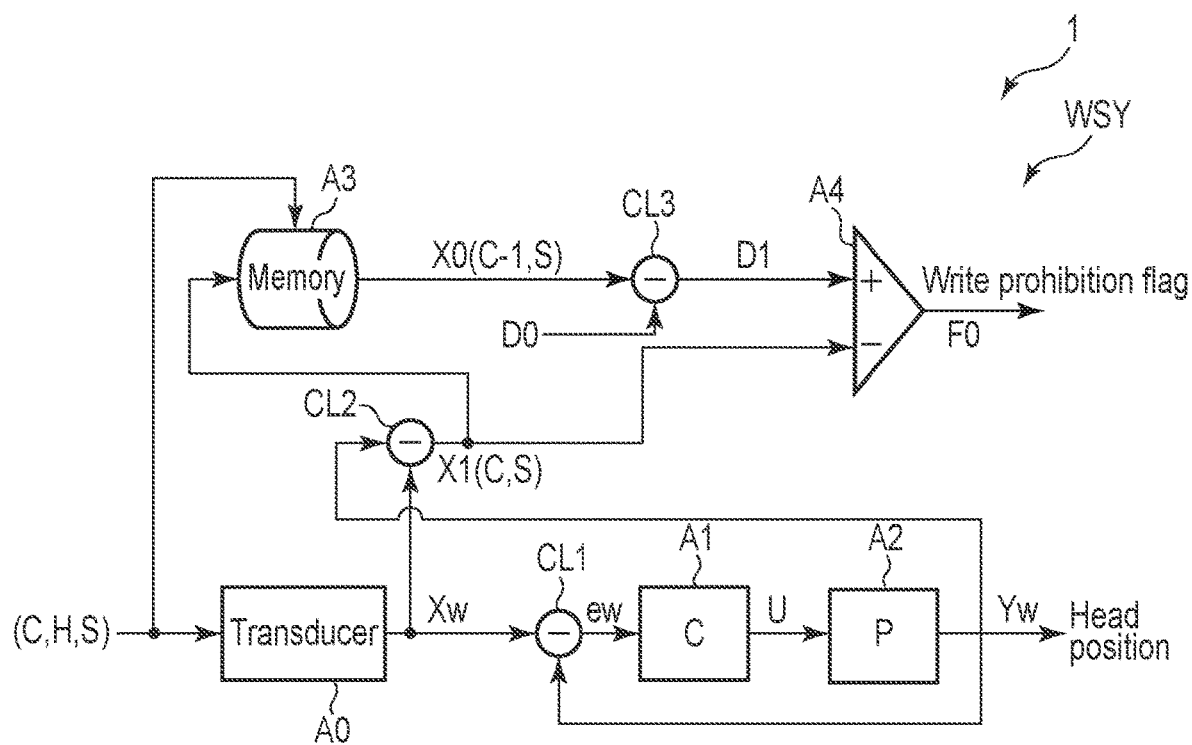
F I G. 9
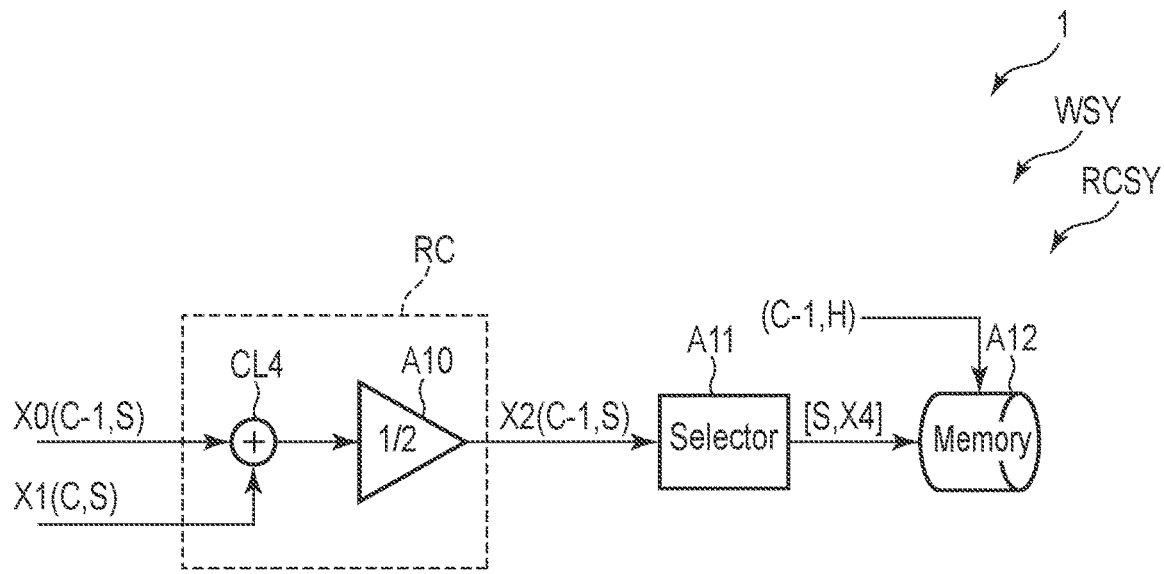
F I G. 10

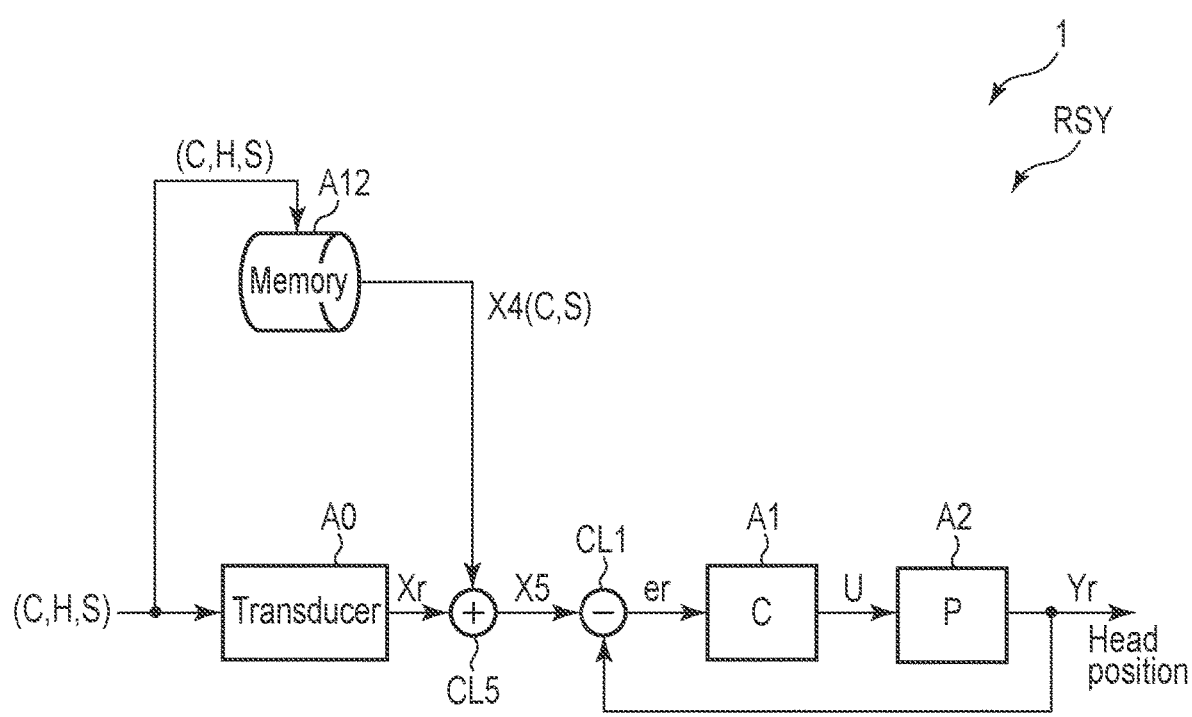
F I G. 11

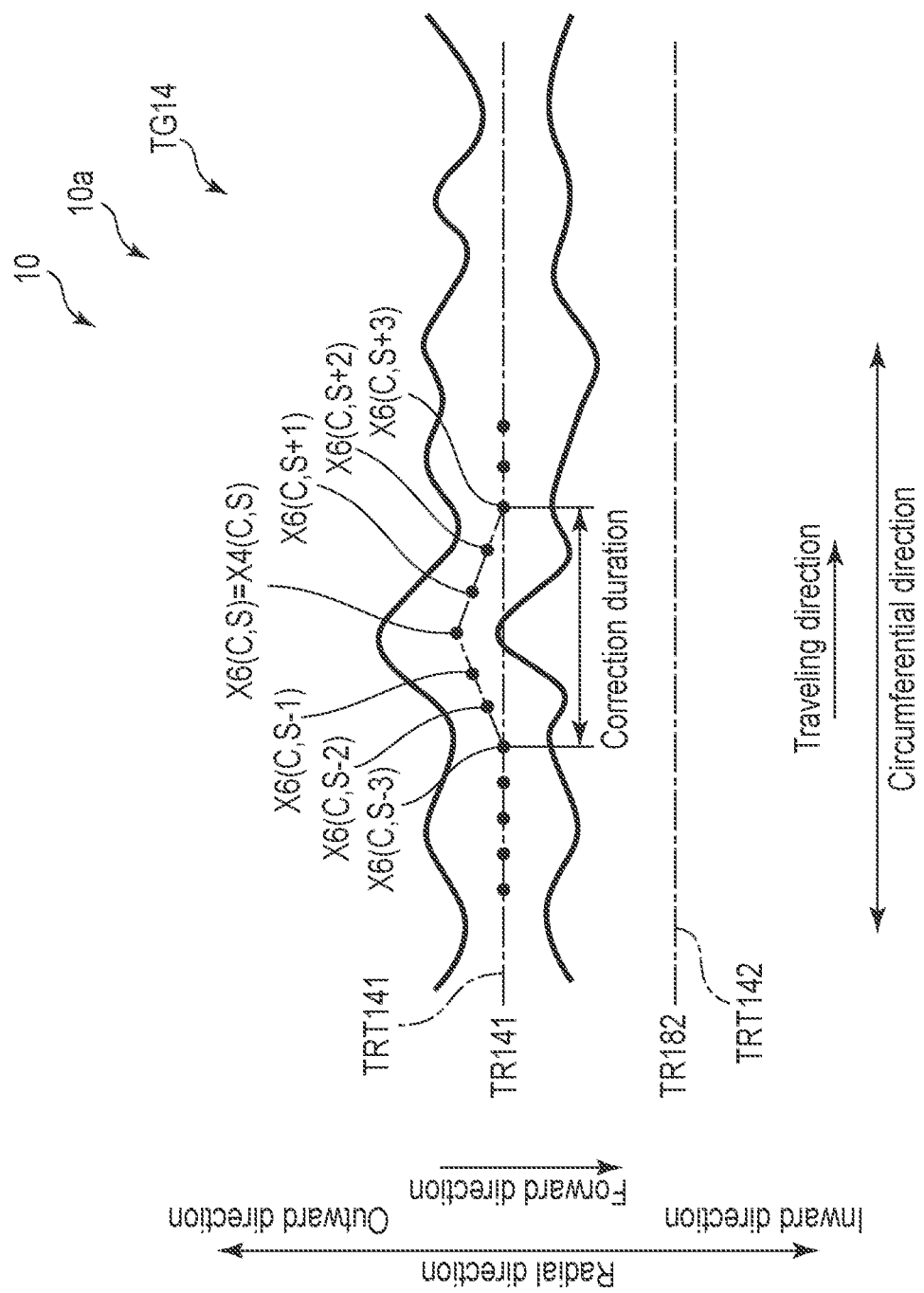
F I G. 15

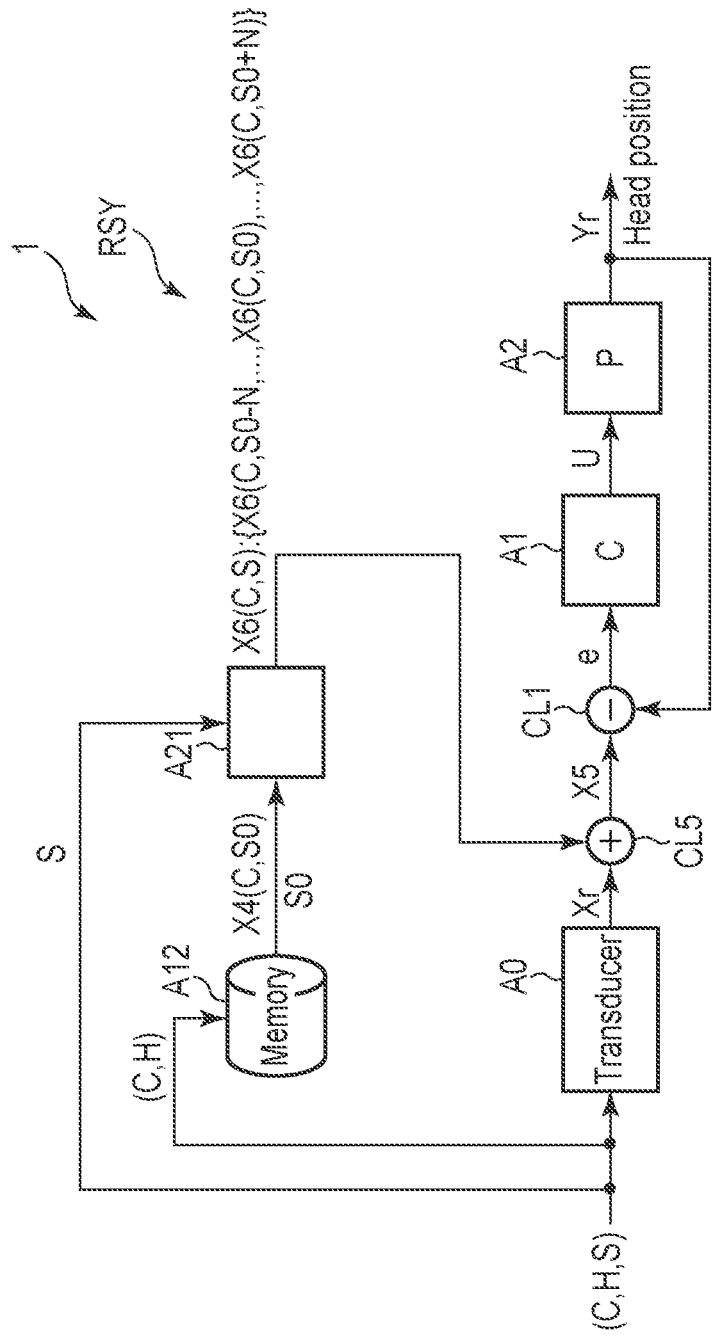
F I G. 16

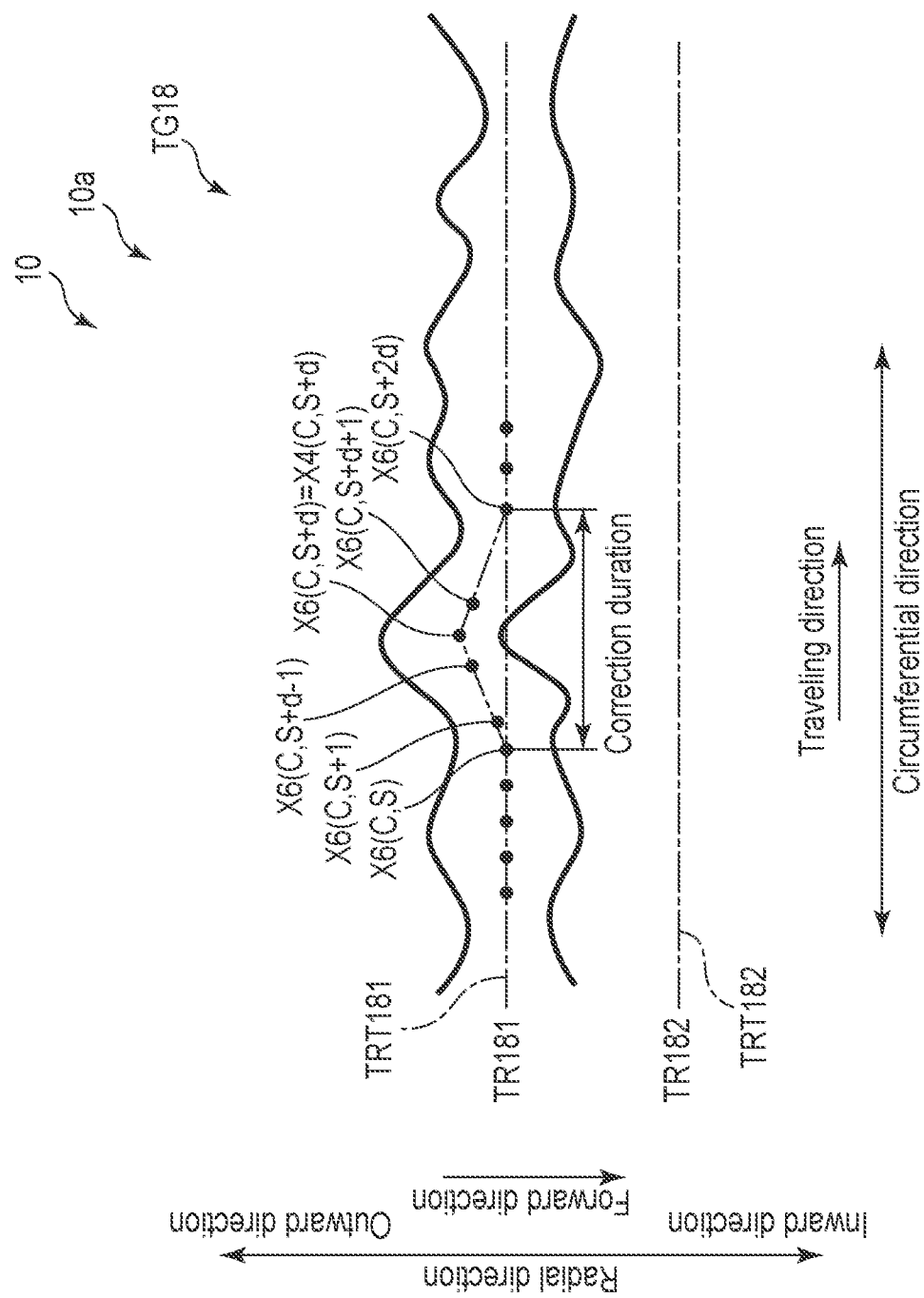
F I G. 18

MAGNETIC DISK DEVICE AND READ PROCESSING METHOD

CROSS-REFERENCE TO RELATED APPLICATIONS

This application is based upon and claims the benefit of priority from Japanese Patent Application No. 2020-107840, filed Jun. 23, 2020, the entire contents of which are incorporated herein by reference.

FIELD

Embodiments described herein relate generally to a magnetic disk device and a read processing method.

BACKGROUND

In a magnetic disk device, a method has been proposed in which a path of a head at the time of processing of writing data to a disk is recorded, and an error rate is improved by reading the data based on the path of the head at the time of the write processing. The path of the head at the time of the write processing may be recorded in a memory or the like as non-volatile data, for example. A huge recording capacity is required to record the paths of the head in all write processing corresponding to all tracks of the disk.

BRIEF DESCRIPTION OF THE DRAWINGS

FIG. 1 is a block diagram showing a configuration of a magnetic disk device according to a first embodiment.

FIG. 3 is a schematic diagram showing an example of a band region.

FIG. 5 is a schematic diagram showing an example of an ATC.

FIG. 9 is a block diagram showing an example of a positioning control system of the head at the time of write processing according to the first embodiment.

FIG. 10 is a block diagram showing an example of a recording function system of the correction read offset amount in the first embodiment.

FIG. 11 is a block diagram showing an example of a positioning control system of the head at the time of read processing according to the first embodiment.

FIG. 15 is a schematic diagram showing an example of a calculation method for a correction read offset amount.

FIG. 16 is a block diagram showing an example of a read control system according to a first modification example.

FIG. 18 is a schematic diagram showing an example of the calculation method for a correction read offset amount.

DETAILED DESCRIPTION

Figure 2:
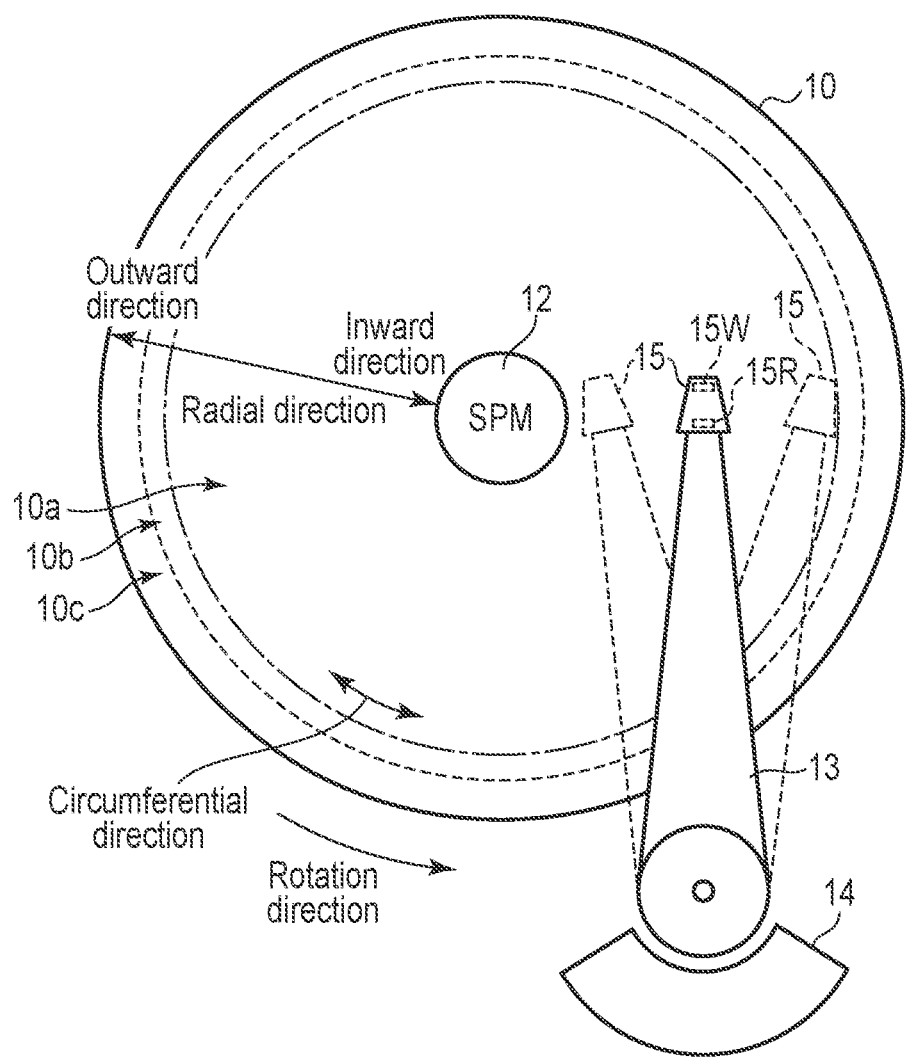
FIG. 2 is a schematic diagram showing an example of arrangement of a head with respect to a disk according to the first embodiment.

In general, according to one embodiment, a magnetic disk device comprising: a disk including a first sector arranged at a first radial position deviated from a target position in a radial direction by a first offset amount larger than a first threshold value; a head that writes data to the disk and reads data from the disk; and a controller that reads the first sector by arranging the head at a second radial position deviated from the target position by a second offset amount different from the first offset amount. Hereinafter, embodiments will be described with reference to the drawings. The drawings are examples, and do not limit the scope of the invention.

First Embodiment

FIG. 1 is a block diagram showing a configuration of a magnetic disk device 1 according to a first embodiment.

The magnetic disk device 1 includes a head disk assembly (HDA) described later, a driver IC 20, a head amplifier integrated circuit (which may be hereinafter referred to as a head amplifier IC or a preamplifier) 30, a volatile memory 70, a non-volatile memory 80, a buffer memory (buffer) 90, and a system controller 130 which is an integrated circuit of one chip. Further, the magnetic disk device 1 is connected to a host system (host) 100.

The HDA includes a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 and rotates by driving the spindle motor 12. The arm 13 and the VCM 14 form an actuator. The actuator controls the movement of the head 15 mounted on the arm 13 to a particular position of the disk 10 by driving the VCM 14. The disk 10 and the head 15 may be provided in two or more numbers. Hereinafter, data to be written to each unit and an external device of the magnetic disk device 1, for example, the disk 10 may be referred to as write data, and data read from each unit and the external device of the magnetic disk device 1, for example, the disk 10 may be referred to as read data. The write data may be simply referred to as data, the read data may be simply referred to as data, and the write data and the read data may be collectively referred to as data.

In the disk 10, in a region in which data is writable, there are allocated a user data region 10a available to a user, a media cache (which may be referred to as a media cache region) 10b in which data (or a command) transferred from the host 100 or the like is temporarily held before the data is written in a particular region of the user data region 10a, and a system area 10c in which information necessary for system management is recorded. Hereinafter, the direction from the inner circumference to the outer circumference of the disk 10 or the direction from the outer circumference to the inner circumference of the disk 10 is referred to as a radial direction. In the radial direction, the direction from the inner circumference to the outer circumference is referred to as an outward direction (or an outer side), and the direction from the outer circumference to the inner circumference, that is, the direction opposite to the outer direction is referred to as an inward direction (or an inner side). The direction orthogonal to the radial direction of the disk 10 is referred to as a circumferential direction. That is, the circumferential direction corresponds to the direction along the circumference of the disk 10. Further, a particular position in the radial direction of the disk 10 may be referred to as a radial position, and a particular position in the circumferential direction of the disk 10 may be referred to as a circumferential position. The radial position and the circumferential position may be collectively referred to as a position. The disk 10 is divided into a plurality of regions (which may be hereinafter referred to as zones or zone regions) for each particular range in the radial direction. Data may be written in the zone for each particular range in the radial direction. In other words, a plurality of tracks may be written in the zone. Data may be written in the track for each particular range in the circumferential direction. In other words, the track includes a plurality of sectors. The "track" is used as a meaning of one of a plurality of regions obtained by dividing the disk 10 into particular ranges in the radial direction, a path of the head 15 at a particular radial position of the disk 10, data extending in the circumferential direction in a particular radial direction of the disk 10, data for one round written in a particular track of the disk 10, data written in a particular track of the disk 10, or other various meanings. The "sector" is used as a meaning of one of a plurality of regions obtained by dividing a particular track of the disk 10 in the circumferential direction, data written at a particular circumferential position at a particular radial position of the disk 10, data written in a particular sector of the disk 10, or other various meanings. The "width of the track in the radial direction" may be referred to as a "track width". Further, the "width of the sector in the radial direction" may be referred to as a "sector width".

In the user data region 10a, user data or the like requested to be written by a command from the host 100 or the like may be written. For example, in the user data region 10a, data may be written by shingled magnetic recording (or shingled magnetic recording processing) in which a plurality of tracks are written in one direction of the radial direction in an overlapping manner. In the user data region 10a, the tracks may be written at particular intervals in the radial direction, that is, the data may be written by normal recording (or normal recording processing) without overwriting. The track density (track per inch: TPI) of the region where a plurality of tracks are written by shingled magnetic recording is higher than the track density of the region where a plurality of tracks are written by normal recording. In the user data region 10a, a plurality of tracks (track groups) may be recorded by shingled magnetic recording for each particular region (which may be hereinafter referred to as a band or a band region). For example, the zone may be divided into a plurality of band regions. In the band region, the plurality of tracks recorded by shingled magnetic recording includes at least one track in which tracks adjacent to each other in the radial direction (which may be hereinafter referred to as adjacent tracks) are partially overwritten, and a track to be overwritten last on at least one overwritten track (which may be hereinafter referred to as a last track). Here, "adjacent" includes not only the state where data, an object, a region, a space, etc., are arranged in contact with each other, but also the state where they are arranged at particular intervals. Since the last track is not partially overwritten with another track, the last track is larger in the width of the track in the radial direction (which may be hereinafter referred to as a track width) than the partially overwritten track. Two band regions adjacent to each other in the radial direction may be arranged at an interval (with a gap) from each other.

The head 15 includes a slider as a main body, and includes a write head 15W and a read head 15R mounted on the slider. The write head 15W writes data to the disk 10. For example, the write head 15W writes a particular track to the disk 10. The read head 15R reads the data recorded on the disk 10. For example, the read head 15R reads a particular track on the disk 10.

FIG. 2 is a schematic diagram showing an example of the arrangement of the head 15 with respect to the disk 10 according to the present embodiment. As shown in FIG. 2, the direction in which the disk 10 rotates in the circumferential direction is referred to as a rotation direction. In the example shown in FIG. 2, the rotation direction is shown in the counterclockwise direction, but it may be in the opposite (clockwise) direction.

The head 15 rotates about a rotation axis by driving the VCM 14 with respect to the disk 10 and moves to a particular position from the inward direction to the outward direction or from the outward direction to the inward direction.

In the example shown in FIG. 2, in the disk 10, the media cache region 10b is arranged in the outward direction of the user data region 10a. The media cache region 10b may be arranged at a position different from the position shown in FIG. 2. Further, in the disk 10, the system area 10c is arranged in the outward direction of the media cache region 10b. In the example shown in FIG. 2, the system area 10c is arranged on the outermost circumference of the disk 10. The system area 10c may be arranged at a position different from the position shown in FIG. 2.

FIG. 3 is a schematic diagram showing an example of a band region TGn. FIG. 3 shows only the configurations required for explanation. As shown in FIG. 3, the direction in which data is written and read sequentially in the radial direction is referred to as a forward direction. The forward direction corresponds to, for example, the direction in which another track is overwritten on a particular track in shingled magnetic recording. In FIG. 3, the forward direction is the inward direction. The forward direction may be the outward direction. As shown in FIG. 3, the direction in which the head 15 travels in the circumferential direction is referred to as a traveling direction. The traveling direction is, for example, the direction opposite to the rotation direction.

In FIG. 3, the band region TGn is arranged in the user data region 10a. In FIG. 3, tracks TRn, TRn+1, TRn+2, and TRn+3 are overwritten in the forward direction in the stated order in the band region TGn. For example, the tracks TRn to TRn+3 have a circle shape concentric with the disk 10. For example, both ends of the tracks TRn to TRn+3 in the circumferential direction are coincident. Further, the tracks TRn to TRn+3 may be deviated due to disturbance or other influences. For example, the tracks TRn to TRn+3 may have a wavy shape that is offset in the radial direction at each circumferential position. It is assumed that four tracks TRn to TRn+3 are written in the band region TGn, but less than four tracks may be written, or more than four tracks may be written.

The track TRn is written in the band region TGn with a track width WWn from an end EOn in the outward direction to an end EIn in the inward direction. The track TRn+1 is overwritten in the band region TGn on a part of the track TRn in the inward direction with a track width WWn+1 from an end EOn+1 in the outward direction to an end EIn+1 in the inward direction. The track TRn+2 is overwritten in the band region TGn on a part of the track TRn+1 in the inward direction with a track width WWn+2 from an end EOn+2 in the outward direction to an end EIn+2 in the inward direction. The track TRn+3 is overwritten in the band region TGn on a part of the track TRn+2 in the inward direction with a track width WWn+3 from an end EOn+3 in the outward direction to an end EIn+3 in the inward direction.

In a region of the track TRn where the track TRn+1 is not overwritten (which may be hereinafter simply referred to as the track TRn) has a track width RWn corresponding to a distance from the end EOn to the end EOn+1. The track width RWn is smaller than a track width WWn. In a region of the track TRn+1 where the track TRn+2 is not overwritten (which may be hereinafter simply referred to as the track TRn+1) has a track width RWn+1 corresponding to a distance from the end EOn+1 to the end EOn+2. The track width RWn+1 is smaller than the track width WWn+1. In a region of the track TRn+2 where the track TRn+3 is not overwritten (which may be hereinafter simply referred to as the track TRn+2) has a track width RWn+2 corresponding to a distance from the end EOn+2 to the end EOn+3. The track width RWn+2 is smaller than the track width WWn+2.

The driver IC 20 controls the drive of the SPM 12 and the VCM 14 according to control of the system controller 130 (specifically, an MPU 60 described later).

The head amplifier IC (preamplifier) 30 includes a read amplifier and a write driver. The read amplifier amplifies a read signal read from the disk 10 and outputs it to the system controller 130 (specifically, a read/write (R/W) channel 40 described later). The write driver outputs a write current corresponding to write data output from the R/W channel 40 to the head 15.

The volatile memory 70 is a semiconductor memory in which stored data is lost when power supply is cut off. The volatile memory 70 stores data and the like required for processing in each unit of the magnetic disk device 1. The volatile memory 70 is, for example, dynamic random access memory (DRAM) or synchronous dynamic random access memory (SDRAM).

The non-volatile memory 80 is a semiconductor memory that records stored data even when power supply is cut off. The non-volatile memory 80 is, for example, a NOR type or NAND type flash ROM (flash read only memory: FROM).

The buffer memory 90 is a semiconductor memory that temporarily records data and the like transmitted and received between the magnetic disk device 1 and the host 100. The buffer memory 90 may be integrally configured with the volatile memory 70. The buffer memory 90 is, for example, DRAM, static random access memory (SRAM), SDRAM, ferroelectric random access memory (FeRAM), magnetoresistive random access memory (MRAM), or the like.

The system controller (controller) 130 is realized, for example, by using a large-scale integrated circuit (LSI) called system-on-a-chip (SoC) in which a plurality of elements are integrated on a single chip. The system controller 130 includes the read/write (R/W) channel 40, a hard disk controller (HDC) 50, a microprocessor (MPU) 60, and the like. The R/W channel 40, the HDC 50, and the MPU 60 are electrically connected to each other. The system controller 130 is electrically connected to, for example, the driver IC 20, the head amplifier IC 30, the volatile memory 70, the non-volatile memory 80, the buffer memory 90, the host system 100, and the like.

The R/W channel 40 executes signal processing of data transferred from the disk 10 to the host 100, for example, read data and data transferred from the host 100, for example, write data in response to an instruction from the MPU 60 described later. The R/W channel 40 has a circuit or a function for measuring the signal quality of read data. The R/W channel 40 is electrically connected to, for example, the head amplifier IC 30, the HDC 50, the MPU 60, and the like.

The HDC 50 controls transfer of data. For example, the HDC 50 controls transfer of data between the host 100 and the disk 10 in response to an instruction from the MPU 60 described later. The HDC 50 is electrically connected to, for example, the R/W channel 40, the MPU 60, the volatile memory 70, the non-volatile memory 80, the buffer memory 90, and the like.

The MPU 60 is a main controller that controls each unit of the magnetic disk device 1. The MPU 60 controls the VCM 14 via the driver IC 20 and executes servo control for positioning the head 15. The MPU 60 controls the SPM 12 via the driver IC 20 and rotates the disk 10. The MPU 60 controls an operation of writing data on the disk 10 and selects the storage destination of the data transferred from the host 100, for example, the write data. Further, the MPU 60 controls an operation of reading data from the disk 10 and also controls processing of the data transferred from the disk 10 to the host 100, for example, the read data. The MPU 60 is connected to each unit of the magnetic disk device 1. The MPU 60 is electrically connected to, for example, the driver IC 20, the R/W channel 40, the HDC 50, and the like.

The MPU 60 includes a write controller 610 that controls write processing, a read controller 620 that controls read processing, and the like. The MPU 60 executes processing of each of these units, for example, the write controller 610 and the read controller 620 on firmware. The MPU 60 may include each of these units, for example, the write controller 610 and the read controller 620 as a circuit. Hereinafter, "write" or "write processing" and "read" or "read processing" may be collectively expressed by the term "access" or "access processing".

The write controller 610 controls the write processing of data according to a command from the host 100 or the like. The write controller 610 controls the VCM 14 via the driver IC 20, arranges the head 15 at a particular position of the disk 10, and writes data. Hereinafter, "positioning the center of the head 15 (write head 15W or read head 15R) at a particular position" or "arranging the center of the head 15 (write head 15W or read head 15R) at a particular position" may be simply referred to as "positioning the head 15 (write head 15W or read head 15R) at a particular position" or "arranging the center of the head 15 (write head 15W or read head 15R) at a particular position". Further "positioning the head 15 (write head 15W or read head 15R) at a particular position" or "arranging the head 15 (write head 15W or read head 15R) at a particular position" may be simply referred to as "positioning" or "arranging".

The write controller 610 arranges the head 15 (write head 15W) at a position as a target at the time of write processing and writes data (which may be hereinafter referred to as a target position or a target write position). The write controller 610 arranges the head 15 at the target write position and randomly writes data. In other words, the write controller 610 arranges the head 15 at a radial position as a target at the time of write processing (which may be hereinafter referred to as a target radial position or a target write radial position) at a particular circumferential position and randomly writes data. For example, the write controller 610 controls the head 15 so as to be arranged at the target write radial position at the particular circumferential position and randomly writes a particular sector.

The write controller 610 arranges the head 15 at an optimum target write position (which may be hereinafter referred to as an optimum position or an optimum wright position) at the time of write processing and writes data. The write controller 610 arranges the head 15 at the optimum write position and randomly writes data. In other words, the write controller 610 arranges the head 15 at an optimum target write radial position (which may be hereinafter referred to as an optimum radial position or an optimum write radial position) at a particular circumferential position and randomly writes data. For example, the write controller 610 controls the head 15 so as to be arranged at the optimum write radial position at the particular circumferential position and randomly writes a particular sector. For example, the optimum position, the optimum write position, and the optimum write radial position correspond to radial positions on a perfect circle concentric with the disk 10.

The write controller 610 may control the head 15 so as to be arranged at the optimum write position and randomly write data at a particular position (which may be hereinafter referred to as an actual position or an actual write position). The actual write position may be the optimum write position or a position deviated from the optimum write position. For example, the write controller 610 controls the head 15 so as to be arranged at the optimum write position, and the write controller 610 arranges the head 15 at a particular radial position (which may be hereinafter referred to as an actual radial position or an actual write radial position) at a particular circumferential position and randomly writes a particular sector. The actual write radial position may be the optimum write radial position or a position deviated in the radial direction from the optimum write radial position.

The write controller 610 arranges the head 15 at the target write position and sequentially writes the data. In other words, the write controller 610 controls the head 15 along a path passing through each target write radial position corresponding to each circumferential position (which may be hereinafter referred to as a target path or a target write path) and sequentially writes the data. For example, the write controller 610 controls the head 15 along the target write path and sequentially writes a particular track.

The write controller 610 arranges the head 15 at the optimum write position and sequentially writes data. In other words, the write controller 610 controls the head 15 along a path passing through each optimum write radial position corresponding to each circumferential position (which may be hereinafter referred to as an optimum path or an optimum write path) and sequentially writes the data. For example, the write controller 610 controls the head 15 along the optimum write path and sequentially writes a particular track. For example, the optimum write path corresponds to a path having a perfect circle shape concentric with the disk 10.

The write controller 610 may control the head 15 so as to move along the optimum write path and sequentially write the data along a path passing through each actual write radial position corresponding to each circumferential position (which may be hereinafter referred to as an actual path or an actual write path). The actual write path may be the optimum write path or may be a path deviated in the radial direction from the optimum write radial position at at least one circumferential position. For example, the write controller 610 controls the head 15 so as to move along the optimum write path and sequentially writes a particular track along the actual write path.

The write controller 610 executes the write processing based on a deviation amount in the radial direction (which may be hereinafter referred to as an offset amount, a positioning error, a write offset amount, or a write positioning error) from the optimum write position (which may be hereinafter referred to as an optimum write radial position or an optimum write path). In other words, the write controller 610 executes the write processing based on the actual write position (actual write radial position or actual write path) of the head 15.

The write controller 610 determines whether to stop (interrupt or prohibit) or execute the write processing based on the write offset amount. For example, the write controller 610 has a threshold value of the write offset amount for stopping the write processing (which may be hereinafter referred to as a drift-off level: DOL). The DOL may be a threshold value of the write offset amount corresponding to a particular position, or may be a change in the threshold value of the write offset amount corresponding to a particular path. When it is determined that the write offset amount is the DOL or less, the write controller 610 executes the write processing. When it is determined that the write offset amount exceeds the DOL (greater than the DOL), the write controller 610 stops the write processing.

The write controller 610 may determine whether to stop or execute the write processing based on the actual write position of the head 15. The write controller 610 may have a range from the optimum write position (optimum write radial position or optimum write path) to the DOL (which may be hereinafter referred to as a DOL range). The DOL range may be a range of a permissible write offset amount corresponding to a particular position or may be a range of a permissible write offset amount corresponding to a particular path. When it is determined that the actual write position (actual write radial position or actual write path) of the head 15 is within the DOL range, the write controller 610 executes the write processing. When it is determined that the actual write position (actual write radial position or actual write path) of the head 15 is out of the DOL range, the write controller 610 stops the write processing.

The write controller 610 records the data by shingled magnetic recording. The write controller 610 executes shingled magnetic recording processing of sequentially writing a plurality of tracks in the forward direction in a partially overlapping manner in the band region. For example, the write controller 610 sequentially performs shingled magnetic recording by overwriting a track as a current object (which may be hereinafter referred to as an object track) on a part of an adjacent track that is adjacent to the object track in a direction opposite to the forward direction (which may be hereinafter referred to as a front track) in the radial direction with respect to the object track. At the time of shingled magnetic recording processing, the write controller 610 may temporarily record the radial position, path, offset amount, DOL, etc., of the head 15 corresponding to the front track and the object track in a memory, for example, a particular region of the disk 10, the volatile memory 70, the non-volatile memory 80, the buffer memory 90, or the like. Further, the write controller 610 may normally record data.

The write controller 610 sets (or changes) the DOL corresponding to the object track based on a front write offset amount corresponding to the front track. In other words, the write controller 610 sets the DOL corresponding to the object track based on an actual write path corresponding to the front track (which may be hereinafter referred to as a front actual path or a front actual write path). For example, at the time of shingled magnetic recording processing, the write controller 610 sets the DOL in the direction opposite to the forward direction (which may be hereinafter referred to as a frontward DOL) with respect to the optimum write path corresponding to the object track based on the front write offset amount corresponding to the front track adjacent to the object track in the direction opposite to the forward direction. In other words, at the time of shingled magnetic recording processing, the write controller 610 sets the frontward DOL corresponding to the object track based on the front actual write path corresponding to the front track adjacent to the object track in the direction opposite to the forward direction. At the time of shingled magnetic recording processing, the write controller 610 may set the frontward DOL corresponding to the object track and a DOL in the forward direction (which may be hereinafter referred to as a backward DOL) with respect to the optimum write path corresponding to the object track based on the front write offset amount corresponding to the front track adjacent to the object track in the direction opposite to the forward direction. In other words, at the time of shingled magnetic recording processing, the write controller 610 may set the frontward DOL corresponding to the object track and the backward DOL corresponding to the object track based on the front actual write path corresponding to the front track adjacent to the object track in the direction opposite to the forward direction.

The write controller 610 sets each DOL corresponding to each sector of the object track (which may be hereinafter referred to as an object sector) based on each front write offset amount corresponding to each sector of the front track (which may be hereinafter referred to as a radial front sector). In other words, the write controller 610 sets each DOL corresponding to each object sector based on each actual write radial position corresponding to each radial front sector (which may be hereinafter referred to as a front actual radial position or a front actual write radial position). For example, at the time of shingled magnetic recording processing, the write controller 610 sets each frontward DOL corresponding to each object sector based on each front write offset amount corresponding to each radial front sector adjacent to each object sector in the direction opposite to the forward direction. In other words, at the time of shingled magnetic recording processing, the write controller 610 sets each frontward DOL corresponding to each object sector based on each front actual write radial position corresponding to each radial front sector adjacent to each object sector in the direction opposite to the forward direction. At the time of shingled magnetic recording processing, the write controller 610 may set each frontward DOL corresponding to each object sector and each backward DOL corresponding to each object sector based on each front write offset amount corresponding to each radial front sector adjacent to each object sector in the direction opposite to the forward direction. In other words, at the time of shingled magnetic recording processing, the write controller 610 may set each frontward DOL corresponding to each object sector and each backward DOL corresponding to each object sector based on each front actual write radial position corresponding to each radial front sector adjacent to each object sector in the direction opposite to the forward direction. Hereinafter, the function of setting the DOL based on the front write offset amount, the front actual write path, the front actual write radial position, or the like, and controlling the write processing as described above may be referred to as a dynamic drift-off level (DDOL) function or a DDOL.

Figure 4:
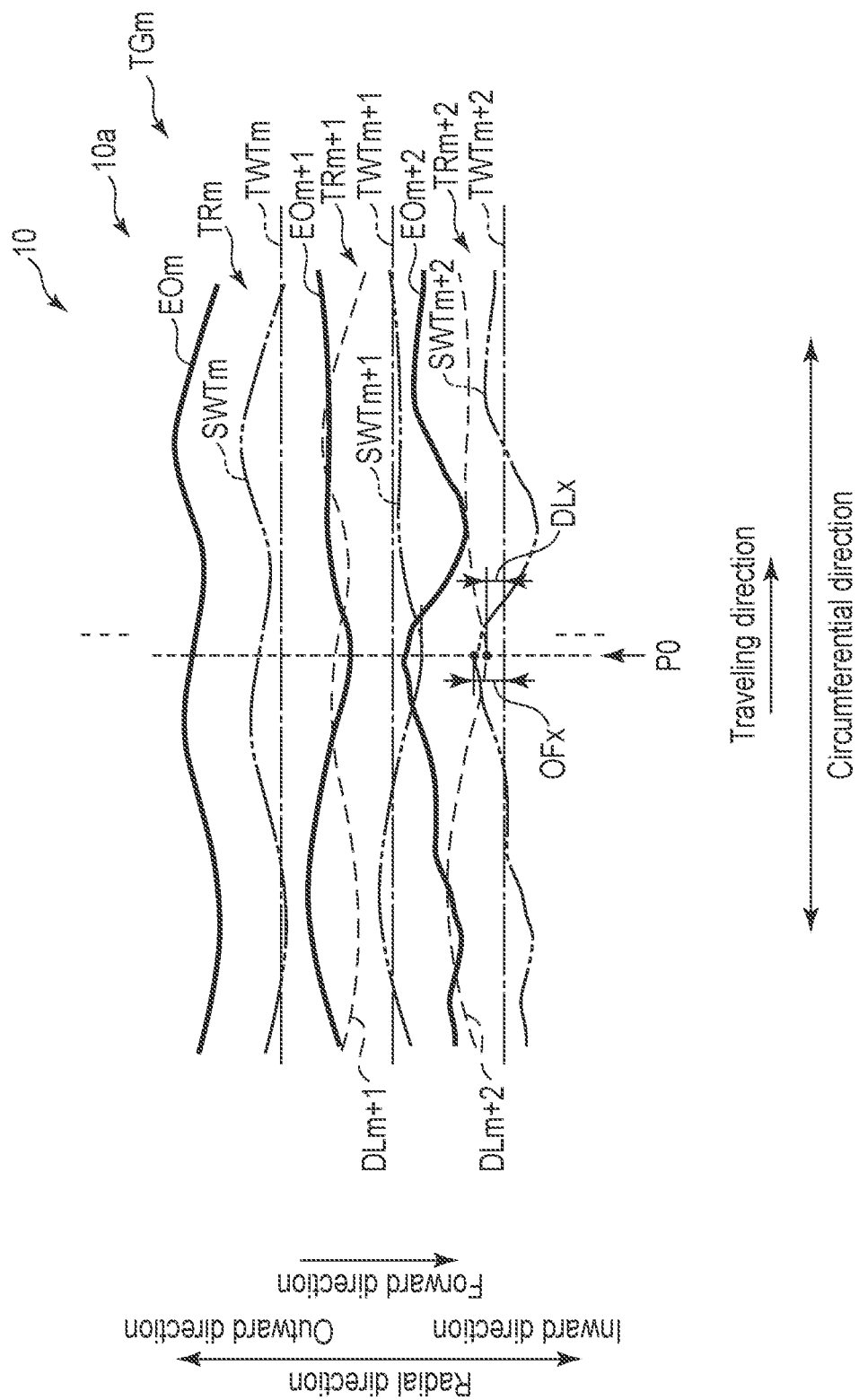
FIG. 4 is a schematic diagram showing an example of a DDOL.

FIG. 4 is a schematic diagram showing an example of the DDOL. In the example shown in FIG. 4, in a band region TGm, tracks TRm, TRm+1, and TRm+2 are overwritten in the forward direction in the stated order. The tracks TRm to TRm+2 are shown to extend in the circumferential direction for convenience of explanation, but are actually curved along the shape of the disk 10. FIG. 4 shows an optimum write path TWTm corresponding to the track TRm, the optimum write path TWTm+1 corresponding to the track TRm+1, and the optimum write path TWTm+2 corresponding to the track TRm+2. The optimum write paths TWTm to TWTm+2 are shown to extend linearly in the circumferential direction for convenience of explanation, but are actually curved according to the shape of the disk 10. For example, the optimum write paths TWTm to TWTm+2 have a circle shape concentric with the disk 10. Further, FIG. 4 shows an actual write path SWTm corresponding to the track TRm, an actual write path SWTm+1 corresponding to the track TRm+1, and an actual write path SWTm+2 corresponding to the track TRm+2. The actual write paths SWTm to SWTm+2 extend in the circumferential direction while fluctuating in the radial direction. The actual write paths SWTm to SWTm+2 are shown to extend in the circumferential direction for convenience of explanation, but are actually curved along the shape of the disk 10. FIG. 4 shows an end EOm in the outward direction of the track TRm, an end EOm+1 of the track TRm+1, an end EOm+1 in the outward direction of track TRm+2, and an end EOm+2 of the track TRm+2. The end EOm corresponds to the actual write path SWTm, the end EOm+1 corresponds to the actual write path SWTm+1, and the end EOm+2 corresponds to the actual write path SWTm+2. FIG. 4 shows a frontward DOL DLm+1 corresponding to the track TRm+1 and a frontward DOL DLm+2 corresponding to the track TRm+2. FIG. 4 shows an offset amount OFx in the outward direction (or the direction opposite to the forward direction) at a circumferential position P0 in the track TRm+2, and a frontward DOL DLx of the frontward DOL DLm+2 corresponding to the circumferential position P0. The absolute value of the offset amount OFx is larger than the absolute value of a DOL DLx.

The write controller 610 controls the head 15 so as to move along the optimum write path TWTm and sequentially records the track TRm by shingled magnetic recording along the actual write path SWTm in the traveling direction. The write controller 610 sets the frontward DOL DLm+1 corresponding to the track TRm+1 based on the actual write path SWTm corresponding to the track TRm. The write controller 610 controls the head 15 so as to move along the optimum write path TWTm+1 and sequentially records the track TRm+1 by shingled magnetic recording in the traveling direction so as to be overlapped on a part of the track TRm along the actual write path SWTm+1.

The write controller 610 sets the frontward DOL DLm+2 corresponding to the track TRm+2 based on the actual write path SWTm+1 corresponding to the track TRm+1. The write controller 610 controls the head 15 so as to move along the optimum write path TWTm+2 and sequentially records the track TRm+2 by shingled magnetic recording in the traveling direction so as to be overlapped on a part of the track TRm+1 along the actual write path SWTm+2.

When it is determined that the offset amount in the direction opposite to the forward direction (for example, the outward direction) at the circumferential position P0 at the time of write processing on the track TRm+2 is larger than the frontward DOL DLm+2, the write controller 610 stops (interrupts or prohibits) the write processing at the circumferential position P0, waits for rotation for the disk 10, and restarts the shingled magnetic recording from the circumferential position P0.

The write controller 610 sets a target write radial position corresponding to an object sector adjacent to a radial front sector in the forward direction (which may be hereinafter referred to as an object target radial position or an object target write radial position) based on the front write offset amount corresponding to the radial front sector. In other words, the write controller 610 sets the object target write radial position corresponding to the object sector adjacent to the radial front sector in the forward direction based on the front actual write radial position corresponding to the radial front sector. For example, when the object target write radial position corresponding to the object sector is set, the write controller 610 controls the head 15 so as to be arranged at the object target write radial position and writes the object sector.

The write controller 610 sets (changes or adjusts) a particular target write position (which may be hereinafter referred to as an adjustment position or an adjustment write position) based on a write offset amount. The write controller 610 sets a target write radial position (which may be hereinafter referred to as an adjustment radial position or an adjustment write radial position) based on the write offset amount. The write controller 610 sets a target write radial position corresponding to an object sector adjacent to a radial front sector in the forward direction (which may be hereinafter referred to as an object adjustment radial position or an object adjustment write radial position) based on the front write offset amount corresponding to the radial front sector. That is, the write controller 610 adjusts or changes the object target write radial position to the object adjustment write radial position from an optimum write radial position corresponding to an object sector adjacent to a radial front sector in the forward direction (which may be hereinafter referred to as an object optimum radial position or an object optimum write radial position) based on the front write offset amount corresponding to the radial front sector. In other words, the write controller 610 adjusts or changes the object target write radial position to the object adjustment write radial position from the object optimum write radial position corresponding to the object sector adjacent to the radial front sector in the forward direction based on the front actual write radial position corresponding to the radial front sector. For example, when the object adjustment write radial position corresponding to the object sector is set, the write controller 610 controls the head 15 so as to be arranged at the object adjustment write radial position and writes the object sector.

The write controller 610 sets a target write path corresponding to an object track adjacent to the front track in the forward direction (which may be hereinafter referred to as an object target path or an object target write path) based on a front write offset amount corresponding to the front track. In other words, the write controller 610 sets the object target write path corresponding to the object track based on the front actual write path corresponding to the front track. For example, when the object target write path corresponding to the object track is set, the write controller 610 controls the head 15 so as to move along the object target write path and writes the object track.

The write controller 610 sets (changes or adjusts) a particular target write path (hereinafter referred to as an adjustment path or an adjustment write path) based on a write offset amount. The write controller 610 sets a target write path corresponding to an object track adjacent to the front track in the forward direction (hereinafter referred to as an object adjustment path or an object adjustment write path) based on a front write offset amount corresponding to the front track. That is, the write controller 610 adjusts or changes the object target write path to the object adjustment write path from an optimum write path corresponding to an object track adjacent to the front track in the forward direction (which may be hereinafter referred to as an object optimum path or an object optimum write path) based on the front write offset amount corresponding to the front track. In other words, the write controller 610 adjusts or changes the object target write path from the object optimum write path adjacent to the front track in the forward direction to the object adjustment write path based on the front actual write path corresponding to the front track. For example, when the object adjustment write path corresponding to the object track is set, the write controller 610 controls the head 15 so as to move along the object adjustment write path and writes the object track.

Hereinafter, the function of setting the adjustment write radial position or the adjustment write path based on the front write offset amount, the front actual write radial position, the front actual write path, or the like, and controlling the write processing may be referred to as an adaptive track center or automatic track width control (ATC) function or an ATC.

FIG. 5 is a schematic diagram showing an example of the ATC. In the example shown in FIG. 5, in a band region TGj, tracks TRj, TRj+1, and TRj+2 are overwritten in the forward direction in the stated order. The tracks TRj to TRj+2 are shown to extend in the circumferential direction for convenience of explanation, but are actually curved along the shape of the disk 10. Further, FIG. 5 shows an optimum write path TWTj corresponding to the track TRj, an optimum write path TWTj+1 corresponding to the track TRj+1, and an optimum write path TWTj+2 corresponding to the track TRj+2. The optimum write paths TWTj to TWTj+2 are shown to extend linearly in the circumferential direction for convenience of explanation, but are actually curved according to the shape of the disk 10. For example, the optimum write paths TWTj to TWTj+2 have a circle shape concentric with the disk 10. Further, FIG. 5 shows an actual write path SWTj corresponding to the track TRj, an actual write path SWTj+1 corresponding to the track TRj+1, and an actual write path SWTj+2 corresponding to the track TRj+2. The actual write paths SWTj to SWTj+2 each extend in the circumferential direction while fluctuating in the radial direction. The actual write paths SWTj to SWTj+2 are shown to extend in the circumferential direction for convenience of explanation, but are actually curved along the shape of the disk 10. FIG. 5 shows an end EOj in the outward direction of the track TRj, an end EOJ+1 in the outward direction of the track TRj+1, and an end EOJ+2 in the outward direction of the track TRj+2. The end EOj corresponds to the actual write path SWTj, the end EOJ+1 corresponds to the actual write path SWTj+1, and the end EOJ+2 corresponds to the actual write path SWTj+2. Further, FIG. 5 shows an adjustment write path AWTj corresponding to the track TRj, an adjustment write path AWTj+1 corresponding to the track TRj+1, and an adjustment write path AWTj+2 corresponding to the track TRj+2. In FIG. 4, the adjustment write path AWTj is equivalent to the optimum write path TWTj. In FIG. 4, the adjustment write path AWTj+1 corresponds to the actual write path SWTj, and the adjustment write path AWTj+2 corresponds to the actual write path SWTj+1.

The write controller 610 controls the head 15 so as to move along the optimum write path TWTj (adjustment write path AWTj) and sequentially records the track TRj by shingled magnetic recording along the actual write path SWTj in the traveling direction. The write controller 610 adjusts (changes or sets) the target write path from the optimum write path TWTj+1 to the adjustment write path AWTj+1 in the track TRj+1 based on the actual write path SWTj corresponding to the track TRj. The write controller 610 controls the head 15 so as to move along the adjustment write path AWTj+1 and sequentially records the track TRj+1 by shingled magnetic recording in the traveling direction so as to be overlapped on a part of the track TRj along the actual write path SWTj+1.

The write controller 610 adjusts (changes) the target write path from the optimum write path TWTj+2 to the adjustment write path AWTj+2 in the track TRj+2 based on the actual write path SWTj+1 corresponding to the track TRj+1. The write controller 610 controls the head 15 so as to move along the adjustment write path AWTj+2 and sequentially records the track TRj+2 by shingled magnetic recording in the traveling direction so as to be overlapped on a part of the track TRj+1 along the actual write path SWTj+2.

The write controller 610 calculates a position as a target at the time of read processing (which may be hereinafter referred to as a target position or a target read position) based on information regarding the position of the head 15 at the time of write processing (which may be hereinafter referred to as a write position information). The write controller 610 calculates a radial position as a target at the time of read processing (hereinafter referred to as a target radial position or a target read radial position) based on the write position information. The write position information includes, for example, the front write offset amount, the front actual write radial position, the front actual write path, a target write radial position corresponding to the front track (which may be hereinafter referred to as a front target write radial position), a target write path corresponding to the front track (which may be hereinafter referred to as a front target write path), an optimum write radial position corresponding to the front track (which may be hereinafter referred to as a front optimum write radial position), an optimum write path corresponding to the front track (which may be hereinafter referred to as a front optimum write path), an adjustment write radial position corresponding to the front track (which may be hereinafter referred to as a front adjustment write path), and an adjustment write path corresponding to the front track (which may be hereinafter referred to as a front adjustment write path). Further, the write position information includes, for example, a write offset amount corresponding to the object track (which may be hereinafter referred to as an object write offset amount), an actual write radial position corresponding to the object track (which may be hereinafter referred to as an object actual write radial position), an actual write path corresponding to the object track (which may be hereinafter referred to as an object actual write path), a target write radial position corresponding to the object track (which may be hereinafter referred to as an object target write radial position), a target write path corresponding to the object track (which may be hereinafter referred to as an object target write path), the object optimum write radial position, the object optimum write path, the object adjustment write radial position, the object adjustment write path, and the like. The write controller 610 calculates a target read radial position corresponding to a particular radial front sector based on the front target write radial position and the object target write radial position. That is, the write controller 610 calculates a path as a target at the time of read processing (which may be hereinafter referred to as a target path or a target read path) based on the write position information. The write controller 610 calculates a target read path corresponding to the front track based on the front target write path and the object target write path.

The write controller 610 calculates an optimum target read position (which may be hereinafter referred to as an optimum position or an optimum read position) based on the write position information. The write controller 610 calculates an optimum target read radial position (which may be hereinafter referred to as an optimum radial position or an optimum read radial position) based on the write position information. The write controller 610 calculates an optimum read radial position at a particular circumferential position corresponding to a particular radial front sector based on the front optimum write radial position and the object optimum write radial position. That is, the write controller 610 calculates an optimum target read path (which may be hereinafter referred to as an optimum path or an optimum read path) based on the write position information. The write controller 610 calculates an optimum target read path corresponding to the front track based on the front optimum write path and the object optimum write path. The optimum position, the optimum read position, and the optimum read radial position correspond to a radial position on a perfect circle concentric with the disk 10. For example, the optimum read path corresponds to a path having a perfect circle shape concentric with the disk 10.

The write controller 610 calculates an adjusted optimum read position (which may be hereinafter referred to as an adjustment position or an adjustment read position) based on the write position information. The write controller 610 calculates an adjusted optimum read radial position (which may be hereinafter referred to as an adjustment radial position or an adjustment read radial position) based on the write position information. The write controller 610 calculates an adjustment read radial position corresponding to a particular radial front sector based on the front actual write radial position and the object actual write radial position. The adjustment read radial position may be, for example, the optimum read radial position or a position deviated in the radial direction from the optimum read radial position. The write controller 610 calculates an adjusted optimum read path (which may be hereinafter referred to as an adjustment path or an adjustment read path) based on the write position information. The write controller 610 calculates an adjustment read path corresponding to the front track based on the front actual write path and the object actual write path. The adjustment read path may be, for example, the optimum read path or a path that is partially or entirely deviated from the optimum read path in the radial direction.

The write controller 610 calculates a corrected adjustment read position (which may be hereinafter referred to as a correction position or a correction read position) based on the write position information. The write controller 610 calculates a corrected adjustment read radial position (which may be hereinafter referred to as a correction radial position or a correction read radial position) based on the write position information. The write controller 610 calculates a correction read radial position corresponding to a particular radial front sector based on the front actual write radial position and the object actual write radial position. The correction read radial position may be, for example, an adjustment read radial position or a radial position different from the adjustment read radial position. The correction read radial position corresponds to, for example, a radial position in which the read head 15R can swing in the radial direction within a positioning error range at the time of read processing (which may be hereinafter referred to as a read positioning error range) in a range in the radial direction (which may be hereinafter referred to as an offset margin) where a bit error rate (which may be hereinafter simply referred to as an error rate) is equal to or smaller than a particular threshold value (which may be hereinafter referred to as an error rate threshold value). The error rate threshold value corresponds to, for example, an error rate threshold value at which data can be appropriately read in read processing. In other words, the error rate threshold value corresponds to, for example, an error rate threshold value that does not cause a read error in read processing. That is, the write controller 610 calculates a corrected adjustment read path (which may be hereinafter referred to as a correction path or a correction read path) based on the write position information. The write controller 610 calculates a correction read path corresponding to the front track based on the front actual write path and the object actual write path. The correction read path may be, for example, the adjustment read path or a path that is partially or entirely deviated from the adjustment read path in the radial direction. The correction read path corresponds to a path in which the read head 15R can swing in the radial direction within the read positioning error range within the offset margin.

The write controller 610 calculates the amount of deviation from the optimum read position in the radial direction (which may be hereinafter referred to as an offset amount, a positioning error, a read offset amount, or a read positioning error).

The write controller 610 calculates a read offset amount from the optimum read radial position to the adjustment read radial position (which may be hereinafter referred to as an adjustment offset amount or an adjustment read offset amount) based on the write position information. The write controller 610 calculates an adjustment read offset amount corresponding to a particular radial front sector based on the front write offset amount and the object write offset amount. For example, the adjustment read offset amount corresponds to a read offset amount obtained by halving the sum of the front write offset amount and the object write offset amount. In other words, the adjustment read offset amount corresponds to a distance which is half the width in the radial direction of the region in which a sector adjacent in the radial direction (which may be hereinafter referred to as an adjacent sector) is not overwritten in a sector in which the adjacent sector is overwritten.

The write controller 610 calculates a read offset amount from the optimum read radial position to the correction read radial position (which may be hereinafter referred to as a correction offset amount or a correction read offset amount) based on the write position information. The write controller 610 calculates a correction read offset amount corresponding to a particular radial front sector based on the front write offset amount and the object write offset amount. The correction read offset amount corresponds to, for example, a particular read offset amount in which the read head 15R can swing in the radial direction within the read positioning error range within the offset margin.

The write controller 610 determines whether or not to record (calculate or set) the read offset amount. The write controller 610 determines whether or not to record (calculate or set) a correction read offset amount corresponding to a particular radial front sector based on an adjustment read offset amount corresponding to the radial front sector and a particular value (which may be hereinafter referred to as a read offset threshold value). The read offset threshold value corresponds to, for example, the maximum amount of deviation (offset amount) of a particular sector in the radial direction in which the read head 15R can swing in the radial direction within the read positioning error range within the offset margin, when the read head 15R is arranged at an optimum read radial position of the sector. When it is determined to record (calculate or set) the correction read offset amount corresponding to the radial front sector, the write controller 610 calculates the correction read offset amount corresponding to the radial front sector, and records the correction read offset amount as non-volatile data in a particular recording region, for example, the system area 10c of the disk 10 or a non-volatile recording region such as the non-volatile memory 80. When it is determined not to record (calculate or set) the correction read offset amount corresponding to the radial front sector, the write controller 610 does not calculate the correction read offset amount corresponding to the radial front sector.

When it is determined that the adjustment read offset amount corresponding to the particular radial front sector is larger than the read offset threshold value, the write controller 610 calculates the correction read offset amount corresponding to the radial front sector, and records the calculated correction read offset amount as a table in a particular recording region, for example, the system area 10c of the disk 10 or a non-volatile recording region such as the non-volatile memory 80. When it is determined that the adjustment read offset amount corresponding to the particular radial front sector is equal to or smaller than the read offset threshold value, the write controller 610 does not calculate the correction read offset amount corresponding to the radial front sector.

Figure 6:
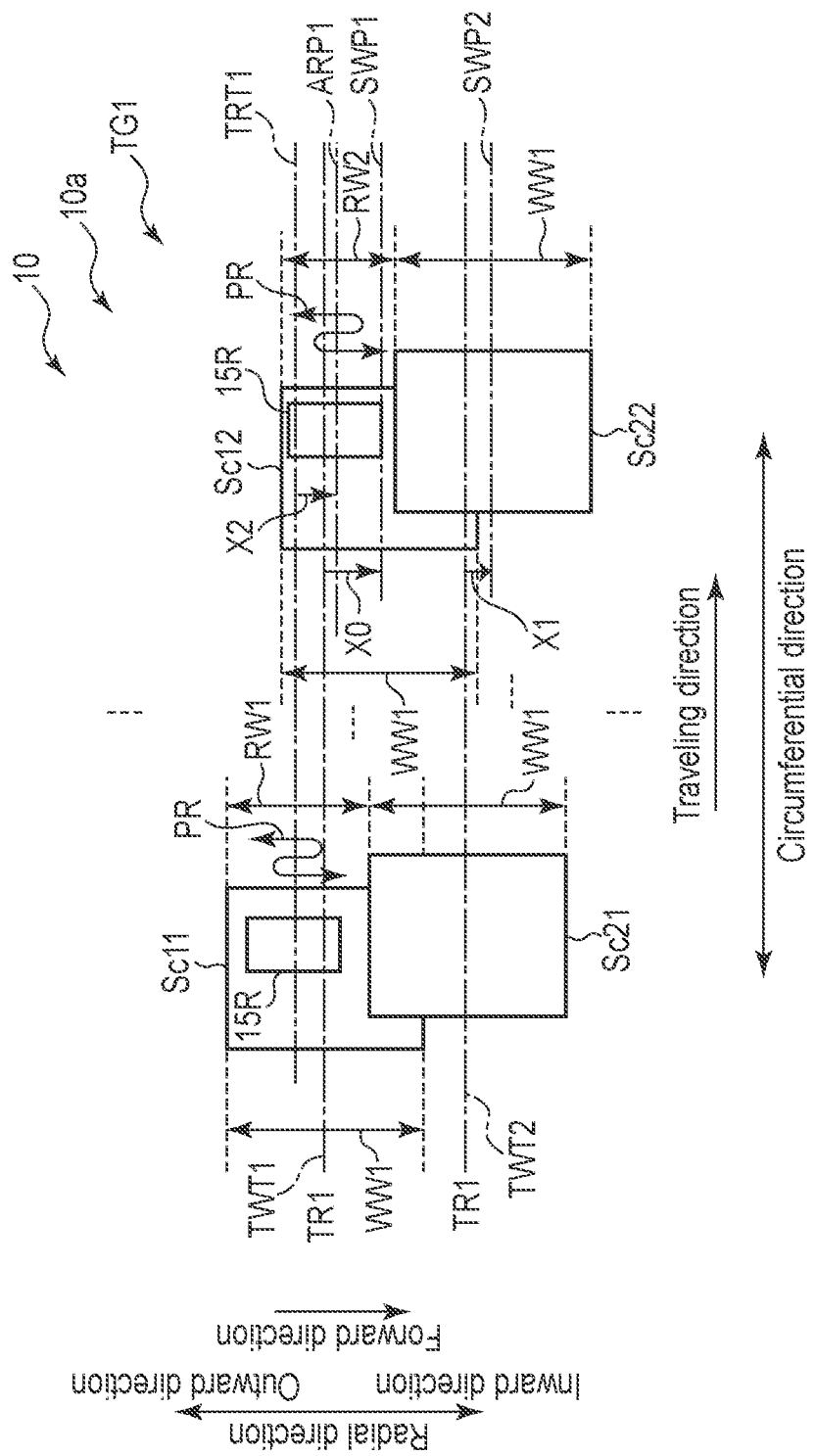
FIG. 6 is a schematic diagram showing an example of a calculation method for an adjustment read offset amount.

FIG. 6 is a schematic diagram showing an example of a calculation method for an adjustment read offset amount X2. In a band region TG1, tracks TR1 and TR2 are overwritten in the forward direction in the stated order. FIG. 6 shows a sector Sc11 of the track TR1 and a sector Sc12 of the track TR1. The sector Sc12 is located in the circumferential direction of the sector Sc11. FIG. 6 shows a width WW1 in the radial direction of the sector Sc11 (which may be hereinafter referred to as a sector width) at the time of write processing and a sector width WW1 of the sector Sc12 at the time of write processing. FIG. 6 shows a sector Sc21 of the track TR2 and a sector Sc22 of the track TR2. The sector Sc22 is located in the circumferential direction of the sector Sc21. The sector Sc21 is overwritten on the sector Sc11 in the forward direction. The sector Sc22 is overwritten on the sector Sc12 in the forward direction. FIG. 6 shows a sector width WW1 of the sector Sc21 at the time of write processing and a sector width WW1 of the sector Sc22 at the time of write processing. The sector Sc12 may be adjacent to the sector Sc11 in the circumferential direction. FIG. 6 shows an optimum write path TWT1 corresponding to the track TR1 and an optimum write path TWT2 corresponding to the track TR2. The optimum write paths TWT1 and TWT2 are shown to extend linearly in the circumferential direction for convenience of explanation, but are actually curved according to the shape of the disk 10. For example, the optimum write paths TWT1 and TWT2 have a circle shape concentric with the disk 10. In the example shown in FIG. 6, the optimum write path TWT1 passes through the radial center of the sector width WW1 of the sector Sc11. Further, in the example shown in FIG. 6, the optimum write path TWT2 passes through the radial center of the sector width WW1 of the sector Sc21. FIG. 6 shows an actual write radial position SWP1 corresponding to the sector Sc12 and an actual write radial position SWP2 corresponding to the sector Sc22. In the example shown in FIG. 6, the actual write radial position SWP1 is located at the radial center of the sector width WW1 of the sector Sc12. Further, in the example shown in FIG. 6, the actual write radial position SWP2 is located at the radial center of the sector width WW1 of the sector Sc22. FIG. 6 shows a write offset amount X0 in the sector Sc12 and a write offset amount X1 corresponding to the sector Sc22. The write offset amount X0 corresponds to the distance between the optimum write path TWT1 in the sector Sc12 (for example, an optimum write radial position in the sector Sc12) and the actual write radial position SWP1. The write offset amount X1 corresponds to the distance between the optimum write path TWT2 in the sector Sc22 (for example, an actual write radial position in the sector Sc22) and the actual write radial position SWP2. FIG. 6 shows a sector width RW1 of the sector Sc11 in which the sector Sc2*l* is not overwritten and a sector width RW2 of the sector Sc12 in which the sector Sc22 is not overwritten. FIG. 6 shows an optimum read path TRT1 corresponding to the track TR1. In the example shown in FIG. 6, the optimum read path TRT1 passes through the radial center of the sector width RW1 of the sector Sc11. FIG. 6 shows an adjustment read radial position ARP1 corresponding to the sector Sc12. FIG. 6 shows the adjustment read offset amount X2 corresponding to the sector Sc12. The adjustment read offset amount X2 corresponds to the distance between the optimum read path TRT1 in the sector Sc12 (for example, an optimum read radial position in the sector Sc12) and the adjustment read radial position ARP1. In the example shown in FIG. 6, the adjustment read radial position ARP1 is located at the radial center of the sector width RW2 of the sector Sc12. FIG. 6 shows the read head 15R for convenience of explanation. Further, FIG. 6 shows a read positioning error range PR.

The write controller 610 records the sector Sc11 of the track TR1 by shingled magnetic recording along the optimum write path TWT1. The write controller 610 controls the head 15 along the optimum write path TWT1 to arrange the head 15 at the actual write radial position SWP1 deviated from the optimum write path TWT1 in the forward direction by the write offset amount X0 and records the sector Sc12 of the track TR1 by shingled magnetic recording. The write controller 610 controls the head 15 along the optimum write path TWT2 and overwrites the sector Sc21 of the track TR2 on the sector Sc11. The write controller 610 controls the head 15 along the optimum write path TWT2 to arrange the head 15 at the actual write radial position SWP2 deviated from the optimum write path TWT2 based on the forward direction by the write offset amount X1 and overwrites the sector Sc22 of the track TR2 on the sector Sc12.

The write controller 610 calculates the optimum read path TRT1 based on the sector width RW1 of the sector Sc11 in which the sector Sc21 is not overwritten. For example, the write controller 610 calculates the optimum read path TRT1 passing through a radial position which is ½ of the sector width RW1 of the sector Sc11 in which the sector Sc21 is not overwritten. In the read processing, the read head 15R is arranged in the optimum read path TRT1, and the sector Sc11 is read while the read head 15R swings in the read positioning error range PR.

The write controller 610 calculates the adjustment read radial position ARP1 based on the sector width RW2 of the sector Sc12 in which the sector Sc22 is not overwritten. For example, the write controller 610 calculates the adjustment read radial position ARP1 which is ½ of the sector width RW2 of the sector Sc12 in which the sector Sc22 is not overwritten. Further, for example, the write controller 610 calculates the adjustment read offset amount X2 based on the write offset amount X0 and the write offset amount X1. The write controller 610 calculates the adjustment read offset amount X2 by halving the sum of the write offset amount X0 and the write offset amount X1. That is, the adjustment read offset amount X2 is calculated by the equation $X2=(X0+X1)/2$. The write controller 610 calculates the adjustment read radial position ARP1 deviated from the optimum read path TRT1 by the adjustment read offset amount X2 in the forward direction. In the read processing, the read head 15R is arranged in the adjustment read radial position ARP1, and the sector Sc12 is read while the read head 15R swings in the read positioning error range PR.

Figures 7, 8:
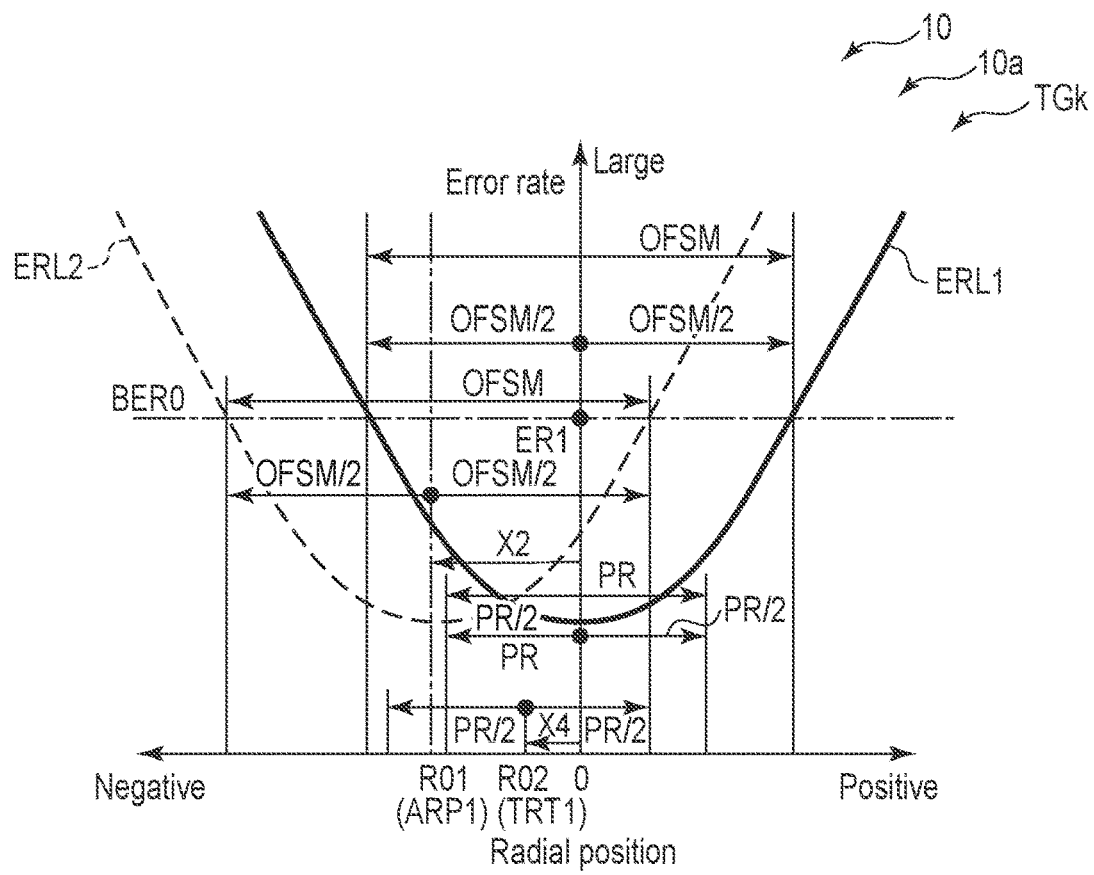
FIG. 7 is a schematic diagram showing an example of a calculation method for a correction read offset amount.
FIG. 8 is a diagram showing an example of a table that records the correction read offset amount.

FIG. 7 is a schematic diagram showing an example of a calculation method for a correction read offset amount X4. FIG. 7 may correspond to FIG. 6. In FIG. 7, the horizontal axis indicates the radial position. In FIG. 7, the positive value of the radial position increases as the radial position advances from the origin 0 toward the tip of the arrow on the horizontal axis, and the negative value of the radial position decreases as the radial position advances from the origin 0 toward the side opposite to the tip of the arrow on the horizontal axis. The horizontal axis of FIG. 7 shows a radial position RO1 and a radial position RO2. In FIG. 7, the radial positions RO1 and RO2 are, for example, negative values. The radial position RO1 is offset from the origin 0 in the direction of the negative value by an offset amount X2. The radial position RO2 is offset from the origin 0 in the direction of the negative value by an offset amount X4. The radial position RO2 is located between the origin 0 and the radial position RO1. In FIG. 7, the origin 0 corresponds to, for example, the optimum read path TRT1. In FIG. 7, the radial position RO1 corresponds to, for example, the adjustment read radial position ARP1. In FIG. 7, the radial position RO2 corresponds to, for example, the correction read radial position. In FIG. 7, the vertical axis indicates the error rate. In FIG. 7, the error rate increases as it advances toward the tip of the arrow on the vertical axis, and decreases as it advances toward the side opposite to the tip of the arrow on the vertical axis. The vertical axis of FIG. 7 shows an error rate ER1. The error rate ER1 corresponds to, for example, an error rate threshold value.

FIG. 7 shows error rate changes ERL1 and ERL2 in the radial direction (which may be hereinafter referred to as error rate changes) in a particular sector of a particular track among a plurality of tracks recorded by shingled magnetic recording in a band region TGk. The error rate change ERL1 corresponds to an error rate change in the radial direction when the sector Sc21, which is written by arranging the write head 15W at the radial position TWT2, is written on the sector Sc11, which is written by arranging the write head 15W at the radial position TWT1, by shingled magnetic recording, and the sector Sc11 thus formed is read around the origin 0 (TRT1). The error rate change ERL2 corresponds to an error rate change in the radial direction when the sector Sc22, which is written by arranging the write head 15W at the radial position SWP2, is written on the sector Sc12, which is written by arranging the write head 15W at the radial position SWP1, by shingled magnetic recording, and the sector Sc12 thus formed is read around the radial position RO1 (ARP1). The error rate change ERL1 shown in FIG. 7 is a curve that becomes the minimum value at the origin 0 (which may be referred to as a bathtub curve). The error rate change ERL2 shown in FIG. 7 is a curve that becomes the minimum value at the radial position RO1. FIG. 7 shows offset margins OFSM corresponding to the error rate changes ERL1 and ERL2. FIG. 7 shows the read positioning error ranges PR corresponding to the error rate changes ERL1 and ERL2. Generally, the read positioning error range PR is smaller than the offset margin OFSM. In the example shown in FIG. 7, the read positioning error range PR in the error rate change ERL1 extends with the origin 0 as the center. In other words, in the example shown in FIG. 7, the read positioning error range PR in the error rate change ERL1 is the range of PR/2 in the positive direction of the radial position from the origin 0, and is the range of PR/2 in the negative direction of the radial position from the origin 0. Here, PR is a positive value. In the example shown in FIG. 7, the read positioning error range PR in the error rate change ERL2 extends with the radial position RO2 as the center. In other words, in the example shown in FIG. 7, the read positioning error range PR in the error rate change ERL2 is the range of PR/2 in the positive direction of the radial position from the radial position RO2, and is the range of PR/2 in the negative direction of the radial position from the radial position RO2.

When writing is performed so as to be deviated from the optimum write radial position in the radial direction at the time of write processing, the write controller 610 calculates the adjustment read radial position RO1 deviated from the optimum read radial position 0 by the adjustment read offset amount X2. In other words, the write controller 610 calculates the adjustment read offset amount X2. The write controller 610 determines whether the adjustment read offset amount X2 is equal to or smaller than the read offset threshold value or larger than the read offset threshold value. In FIG. 7, the read offset threshold value is represented by OFSM/2−PR/2. When the read positioning error is limited by a particular value ROS, the read offset threshold value is represented by OFSM/2−|ROS|. Further, the read offset threshold value may be a value other than OFSM/2−PR/2 and OFSM/2−|ROS|. When it is determined that the adjustment read offset amount X2 is larger than the read offset threshold value, the write controller 610 calculates the correction read offset amount X4. When the read head 15R is arranged at a particular radial position and data is read, the write controller 610 calculates the correction read offset amount X4 so that the read positioning error range PR is included in the offset margin OFSM. In the example shown in FIG. 7, the write controller 610 calculates the correction read offset amount X4 by the equation X4=X2+PR/2−OFSM/2. That is, in the example shown in FIG. 7, the write controller 610 calculates the minimum correction read offset amount X4. The write controller 610 records the correction read offset amount X4 as a table in a particular recording region, for example, the system area 10c of the disk 10 or a non-volatile recording region such as the non-volatile memory 80.

FIG. 8 is a diagram showing an example of a table TB that records the correction read offset amount X4. The table TB shown in FIG. 8 includes a head indicating the head number corresponding to the correction read offset amount, a cylinder (track) indicating the cylinder (track) number corresponding to the correction read offset amount, a sector indicating the sector number corresponding to the correction read offset amount (which may be hereinafter referred to as a correction sector), and the correction read offset amount. The correction sector corresponds to a sector in which the correction read offset amount is calculated and the correction read offset amount and information such as the arranged position are recorded in a particular recording region. In FIG. 8, the head 15 includes heads H0, H1, . . . , Hn. In FIG. 8, the disk 10 includes cylinders (tracks) Cyla, Cylb, . . . , Cylc, . . . , Cyln. In FIG. 8, disk 10 includes correction sectors Sca, Scb, . . . , Scc, . . . , Scn.

When a correction read offset amount Ofa corresponding to the correction sector Sca of the cylinder Cyla is calculated with the head H0, the write controller 610 records the head H0, the cylinder Cyla, the correction sector Sca, and the correction read offset amount Ofa in the table TB stored in a particular recording region, for example, the system area 10c or a non-volatile recording region such as the non-volatile memory 80.

When a correction read offset amount Ofb corresponding to the correction sector Scb of the cylinder Cylb is calculated with the head H0, the write controller 610 records the head H0, the cylinder Cylb, the correction sector Scb, and the correction read offset amount Ofb in the table TB stored in a particular recording region, for example, the system area 10c or a non-volatile recording region such as the non-volatile memory 80.

When a correction read offset amount Ofc corresponding to the correction sector Scc of the cylinder Cylc is calculated with the head H1, the write controller 610 records the head H1, the cylinder Cylc, the correction sector Scc, and the correction read offset amount Ofc in the table TB stored in a particular recording region, for example, the system area 10c or a non-volatile recording region such as the non-volatile memory 80.

When a correction read offset amount Ofn corresponding to the correction sector Scn of the cylinder Cyln is calculated with the head Hn, the write controller 610 records the head Hn, the cylinder Cyln, the correction sector Scn, and the correction read offset amount Ofn in the table TB stored in a particular recording region, for example, the system area 10c or a non-volatile recording region such as the non-volatile memory 80.

The read controller 620 controls read processing of data according to a command from the host 100 or the like. The read controller 620 controls the VCM 14 via the driver IC 20, arranges the head 15 at a particular position of the disk 10, and reads data. The read controller 620 may read the data randomly or sequentially.

The read controller 620 arranges the head 15 (read head 15R) at the target read position and reads the data. The read controller 620 arranges the head 15 at the target read position and reads the data. In other words, the read controller 620 controls the head 15 so as to be arranged at the target read radial position at a particular circumferential position and reads the data. For example, the read controller 620 controls the head 15 so as to be arranged at the target read radial position at a particular circumferential position and reads a particular sector. The read controller 620 may control the head 15 along the target read path and read a particular track.

The read controller 620 arranges the head 15 at the optimum read position and reads the data. The read controller 620 arranges the head 15 at the optimum read position and reads the data. In other words, the read controller 620 controls the head 15 so as to be arranged at the optimum read radial position at a particular circumferential position and reads the data. For example, the read controller 620 controls the head 15 so as to be arranged at the optimum read radial position at a particular circumferential position and reads a particular sector. The read controller 620 may control the head 15 along the optimum read path and read a particular track.

The read controller 620 arranges the head 15 at the correction read radial position and reads the data based on the table TB in which the correction read offset amount is recorded. For example, the read controller 620 determines whether the sector is a correction sector or a sector in which the correction read offset amount is not recorded in the table TB or not calculated (which may be hereinafter referred to as a non-correction sector) based on the table TB in which the correction read offset amount is recorded. In other words, the read controller 620 determines whether the sector is a correction sector or a non-correction sector with reference to the table TB. When it is determined that the sector is a correction sector, the read controller 620 controls the head 15 so as to be arranged at the correction read radial position and reads the correction sector. When it is determined that the sector is a non-correction sector, the read controller 620 controls the head 15 so as to be arranged at the optimum read radial position and reads the non-correction sector. The read controller 620 may control the head 15 along the correction read path that passes through the correction read radial position in the correction sector or the optimum read radial position in the non-correction sector and read a particular track.

The read controller 620 may control the head 15 so as to be arranged at the optimum read position or the correction read position and read data at a particular position (which may be hereinafter referred to as an actual position or an actual read position). The read controller 620 may control the head 15 so as to be arranged at the optimum read radial position or the correction read radial position and read data at a particular radial position (which may be hereinafter referred to as an actual radial position or an actual read radial position). The actual read radial position may be the optimum read radial position, the correction read radial position, or a position deviated in the radial direction from the optimum read radial position and the correction read radial position. The read controller 620 may control the head 15 so as to move along the optimum read path or the correction read path and read data along a path passing through each actual read radial position corresponding to each circumferential position (which may be hereinafter referred to as an actual read path). The actual read path may be the optimum read path, the correction read path, or a path deviated in the radial direction from the optimum read radial position or the correction read radial position at at least one circumferential position.

FIG. 9 is a block diagram showing an example of a positioning control system WSY of the head 15 at the time of write processing according to the present embodiment.

The magnetic disk device 1 includes the positioning control system WSY of the head 15 at the time of write processing (which may be hereinafter referred to as a write control system). The write control system WSY includes a transducer A0, a controller A1, an actuator A2, a memory A3, an arithmetic comparator A4, an arithmetic unit CL1, an arithmetic unit CL2, and an arithmetic unit CL3. The transducer A0, the controller A1, the actuator A2, the memory A3, the arithmetic comparator A4, the arithmetic unit CL1, the arithmetic unit CL2, and the arithmetic unit CL3 are included in, for example, the system controller 130, the disk 10, the volatile memory 70, the non-volatile memory 80, and the buffer memory 90. The actuator A2 includes, for example, the arm 13 and the VCM 14. The memory A3 is included in, for example, the disk 10, the volatile memory 70, the non-volatile memory 80, or the buffer memory 90. The arithmetic unit CL1, the controller A1, and the actuator A2 constitute a feedback system.

In FIG. 9, an object sector (C, H, S) of the sector number S of the object track of the track number C written by the head 15 of the head number H, a target position (optimum position) Xw in the object sector (C, H, S), the object write offset amount X1 (C, S) corresponding to the object sector (C, S), and the front write offset amount X0 (C−1, S) corresponding to the radial front sector (C−1, S) of the sector number S of the front track of the track number C−1 adjacent to the object sector (C, S) in the direction opposite to the forward direction are all processed as a signal or information in the write control system WSY. In addition, an upper limit value D0 of a narrowing amount X0−X1 of the track widths of all tracks of the disk 10 (X0−X1<D0), a DOL D1 of the object sector (C, S), a flag FO that prohibits write processing (which may be hereinafter referred to as a write prohibition flag), an inverse code amount ew of the object write offset amount, a drive amount U of the actuator A2 in the object sector, and an actual position Yw of the head 15 in the object sector are also all processed as a signal or information in the write control system WSY. The sector number S may be the same number between adjacent sectors in the radial direction.

The transducer A0 transduces a physical position corresponding to a logical position of the disk 10 designated by a host device, for example, the host 100, to a radial position of the disk 10. The logical position may be, for example, a logical block address (LBA), and the physical position may be, for example, a servo information array indicating the physical position of the disk 10. The transducer A0 transduces, for example, the combination (C, S) of the track number C of a particular track among a plurality of tracks having a concentric circle shape of the disk 10 in which the head 15 is positioned and the sector number S of a particular sector among a plurality of sectors of the track of the track number C from a servo information array (C: track or cylinder, S: sector, H: head) corresponding to the LBA designated from the host 100 to the target position (optimum position) Xw in the sector of the sector number S.

The controller A1 controls the actuator A2. The controller A1 generates the drive amount U of the head 15 of the actuator A2 based on, for example, the inverse code amount ew of the object write offset amount which is the difference value between the target position (optimum position) Xw and the actual position Yw. The controller A1 may generate the drive amount U based on a value other than the inverse code amount ew of the object write offset amount.

The actuator A2 is driven according to the output of controller A1. The actuator A2 is driven, for example, based on the drive amount U, and moves the head 15 to the actual position Yw in the object sector (C, S).

The memory A3 stores the front write offset amount X0 (C−1, S) of each radial front sector (C−1, S) of the front track C−1. The memory A3 stores the object write offset amount X1 (C, S) of the object sector (C, S) of the object track C. The memory A3 outputs the front write offset amount X0 (C−1, S) of the radial front sector (C−1, S) adjacent to the object sector (C, S) of the object track C in the radial direction.

The arithmetic comparator A4 compares the DOL D1 corresponding to the object sector (C, S) with the object write offset amount X1 (C, S) corresponding to the object sector (C, S) and generates a flag FO when the object write offset amount X1 (C, S) exceeds the DOL D1 (C, S).

When the logical position of the disk 10 at which data is written, for example, the LBA is designated by a host device, for example, the host 100, the write control system WSY converts the LBA to the physical position (C, S) in advance, and outputs the object sector (C, S) to the transducer A0 and the memory A3. The position (C, S) is input to the transducer A0. The transducer A0 transduces the position (C, S) to the target position (optimum position) Xw and outputs it to the arithmetic units CL1 and CL2. The target position (optimum position) Xw and the actual position Yw are input to the arithmetic unit CL1. The arithmetic unit CL1 calculates the inverse code amount ew of the object write offset amount from the difference between the target position (optimum position) Xw and the actual position Yw, and outputs the inverse code amount ew of the object write offset amount to the controller A1. The object write offset amount ew is input to the controller A1. The controller A1 outputs the drive amount U to the actuator A2. The drive amount U is input to the actuator A2. The actuator A2 is driven according to the drive amount U, and moves the head 15, for example, the write head 15W to the actual position Yw corresponding to the drive amount U. The actuator A2 outputs the actual position Yw to the arithmetic units CL1 and CL2.

The target position (optimum position) Xw and the actual position Yw are input to the arithmetic unit CL2. The arithmetic unit CL2 calculates the object write offset amount X1 (C, S) from the difference between the target position Xw and the actual position Yw, and outputs the object write offset amount X1 (C, S) to the memory A3 and the arithmetic comparator A4. The object write offset amount X1 (C, S) of the object sector (C, S) is input to the memory A3. The memory A3 outputs the front write offset amount X0 (C−1, S) of the radial front sector (C−1, S) adjacent to the object sector (C, S) of the object track C in the radial direction to the arithmetic unit CL3. The front write offset amount X0 (C−1, S) and the upper limit value D0 are input to the arithmetic unit CL3. The arithmetic unit CL3 outputs the DOL D1 corresponding to the object sector (C, S) obtained by subtracting the upper limit value D0 from the front write offset amount X0 (C−1, S) to the arithmetic comparator A4. The object write offset amount X1 (C, S) and the DOL D1 in the object sector (C, S) are input to the arithmetic comparator A4. The arithmetic comparator A4 compares the object write offset amount X1 (C, S) with the DOL D1 in the object sector (C, S), and outputs or asserts the flag FO when the object write offset amount X1 (C, S) exceeds the DOL D1 in the object sector (C, S). The arithmetic comparator A4 compares the object write offset amount X1 (C, S) with the DOL D1 in the object sector (C, S), and does not output or negates the flag FO when the object write offset amount X1 (C, S) is equal to or less than the DOL D1 in the object sector (C, S).

FIG. 10 is a block diagram showing an example of a recording function system RCSY of the correction read offset amount X4 in the present embodiment.

The magnetic disk device 1 includes the recording function system RCSY of the correction read offset amount X4 at the time of write processing (which may be hereinafter referred to as a recording function system). For example, the write control system WSY includes the recording function system RCSY. The recording function system RCSY includes an offset amount calculator RC, a selector A11, and a memory A12. The offset amount calculator RC includes an arithmetic unit CL4 and a gain A10. The gain A10, the selector A11, the memory A12, and the arithmetic unit CL4 are included in, for example, the system controller 130, the disk 10, the volatile memory 70, the non-volatile memory 80, or the buffer memory 90.

In FIG. 10, the adjustment read offset amount X2 (C−1, S) corresponding to the radial front sector (C−1, S), the correction read offset amount [S, X4] corresponding to the radial front sector (C−1, S), and the head number (C−1, H) corresponding to the radial front sector (C−1, S) are all processed as a signal or information in the recording function system RCSY.

The recording function system RCSY calculates the adjustment read offset amount X2 (C−1, S) based on the front write offset amount X0 (C−1, S) and the object write offset amount X1 (C, S). The recording function system RCSY calculates the adjustment read offset amount X2 (C−1, S) {X2=(X0+X1)/2} by halving the sum (X0+X1) of the front write offset amount X0 (C−1, S) and the object write offset amount X1 (C, S). The gain A10 halves the sum (X0+X1) of the front write offset amount X0 and the object write offset amount X1.

The selector A11 determines whether or not to record (calculate or set) the correction read offset amount [S, X4] corresponding to the radial front sector (C−1, S) based on the adjustment read offset amount X2 corresponding to the radial front sector (C−1, S). In other words, the selector A11 determines whether or not to correct the adjustment read offset amount X2 corresponding to the radial front sector (C−1, S) based on the adjustment read offset amount X2 corresponding to the radial front sector (C−1, S). For example, the selector A11 determines whether or not to record the correction read offset amount [S, X4] corresponding to the radial front sector (C−1, S) based on whether the adjustment read offset amount X2 corresponding to the radial front sector (C−1, S) is larger than or equal to or smaller than the read offset threshold value. When it is determined that the adjustment read offset amount X2 corresponding to the radial front sector (C−1, S) is larger than the read offset threshold value, the selector A11 determines to record the correction read offset amount [S, X4] corresponding to the radial front sector (C−1, S). When it is determined that the adjustment read offset amount X2 corresponding to the radial front sector (C−1, S) is equal to or smaller than the read offset threshold value, the selector A11 determines not to record the correction read offset amount [S, X4] corresponding to the radial front sector (C−1, S).

The memory A12 records the correction read offset amount [S, X4] corresponding to the particular radial front sector (C−1, S) of the front track C−1 and the head (C−1, H) corresponding to the radial front sector (C−1, S).

The front write offset amount X0 (C−1, S) and the object write offset amount X1 (C, S) are input to the recording function system RCSY. In the recording function system RCSY, the front write offset amount X0 (C−1, S) and the object write offset amount X1 (C, S) are input to the offset amount calculator RC. In the offset amount calculator RC, the front write offset amount X0 (C−1, S) and the object write offset amount X1 (C, S) are input to the arithmetic unit CL4. The arithmetic unit CL4 calculates the sum of the front write offset amount X0 (C−1, S) and the object write offset amount X1 (C, S), and outputs the sum of the front write offset amount X0 (C−1, S) and the object write offset amount X1 (C, S) to the gain A10. The sum of the front write offset amount X0 (C−1, S) and the object write offset amount X1 (C, S) is input to the gain A10. The gain A10 outputs the adjustment read offset amount X2 (C−1, S) obtained by halving the sum of the front write offset amount X0 (C−1, S) and the object write offset amount X1 (C, S) to the selector A11.

The adjustment read offset amount X2 (C−1, S) corresponding to the radial front sector (C−1, S) is input to the selector A11. When it is determined that the adjustment read offset amount X2 (C−1, S) corresponding to the radial front sector (C−1, S) is larger than the read offset threshold value, the selector A11 outputs the correction read offset amount

[S, X4] corresponding to the radial front sector (C−1, S) to the memory A12. When it is determined that the adjustment read offset amount X2 (C−1, S) corresponding to the radial front sector (C−1, S) is equal to or smaller than the read offset threshold value, the selector A11 does not output the correction read offset amount [S, X4] corresponding to the radial front sector (C−1, S). The correction read offset amount [S, X4] corresponding to the radial front sector (C−1, S) and the head (C−1, H) corresponding to the radial front sector (C−1, S) are input to the memory A12. The memory A12 records the correction read offset amount [S, X4] corresponding to the radial front sector (C−1, S) and the head (C−1, H) corresponding to the radial front sector (C−1, S).

FIG. 11 is a block diagram showing an example of a positioning control system RSY of the head 15 at the time of read processing according to the present embodiment.

The magnetic disk device 1 includes the positioning control system RSY of the head 15 at the time of read processing (which may be hereinafter referred to as a read control system). The read control system RSY includes the transducer A0, the controller A1, the actuator A2, the memory A12, the arithmetic unit CL1, and an arithmetic unit CL5. The transducer A0, the controller A1, the actuator A2, the memory A12, the arithmetic unit CL1, and the arithmetic unit CL5 are included in, for example, the system controller 130, the disk 10, the volatile memory 70, the non-volatile memory 80, and the buffer memory 90.

In FIG. 11, the object sector (C, H, S), a target position (optimum position) Xr in the object sector (C, H, S), the correction read offset amount X4 (C, S) corresponding to the object sector (C, H, S), the correction read radial position X5 corresponding to the object sector (C, H, S), an inverse code amount er of the object read offset amount, the drive amount U of actuator A2 in the object sector, and an actual position Yr of the head 15 in the object sector are all processed as a signal or information in the read control system RSY.

The transducer A0 transduces a physical position corresponding to a logical position of the disk 10 designated by a host device, for example, the host 100, to a radial position of the disk 10. The transducer A0 transduces, for example, the combination (C, H, S) of the track number C of a particular track among a plurality of tracks having a concentric circle shape of the disk 10 in which the head of the head number H is positioned, the head number H of a particular head among a plurality of heads, and the sector number S of a particular sector among a plurality of sectors of the track of the track number C from the servo information array (C: track or cylinder, S: sector) corresponding to the LBA designated from the host 100 to the target position (optimum position) Xr in the sector of the sector number S.

The controller A1 controls the actuator A2. The controller A1 generates, for example, the drive amount U of the head 15 of the actuator A2 based on the inverse code amount er of the read offset amount corresponding to the object sector which is the difference value between the correction read radial position X5 and the actual position Yr (which may be hereinafter referred to as an object read offset amount). The controller A1 may generate the drive amount U based on a value other than the inverse code amount er of the object read offset amount.

The actuator A2 is driven according to the output of controller A1. The actuator A2 is driven, for example, based on the drive amount U, and moves the head 15 to the actual position Yr in the object sector (C, H, S).

The memory A12 stores the correction read offset amounts X4 corresponding to some sectors and the head numbers of the heads corresponding to these sectors. The memory A12 outputs the correction read offset amount X4 corresponding to a particular sector.

When the logical position of the disk 10 at which data is read, for example, the LBA is designated by a host device, for example, the host 100, the read control system RSY converts the LBA to the physical position (C, H, S) in advance, and outputs the object sector (C, H, S) to the transducer A0 and the memory A12. The position (C, H, S) is input to the transducer A0. The transducer A0 transduces the position (C, H, S) to the target position (optimum position) Xr and outputs it to the arithmetic unit CL5. The position (C, H, S) is input to the memory A12. The memory A12 outputs the correction read offset amount X4 (C, S) corresponding to the object sector (C, H, S) to the arithmetic unit CL5. The target position (optimum position) Xr and the correction read offset amount X4 (C, S) are input to the arithmetic unit CL5. The arithmetic unit CL5 calculates the correction read radial position X5 from the sum of the target position (optimum position) Xr and the correction read offset amount X4 (C, S), and outputs the correction read radial position X5 to the calculator CL1. The correction read radial position X5 and the actual position Yr are input to the arithmetic unit CL1. The arithmetic unit CL1 calculates the inverse code amount er of the object read offset amount from the difference between the correction read radial position X5 and the actual position Yr, and outputs the inverse code amount er of the object read offset amount to the controller A1. The inverse code amount er of the object read offset amount is input to the controller A1. The controller A1 outputs the drive amount U to the actuator A2. The drive amount U is input to the actuator A2. The actuator A2 is driven according to the drive amount U, and moves the head 15, for example, the read head 15R to the actual position Yr corresponding to the drive amount U. The actuator A2 outputs the actual position Yr to the arithmetic unit CL1.

Figure 12:
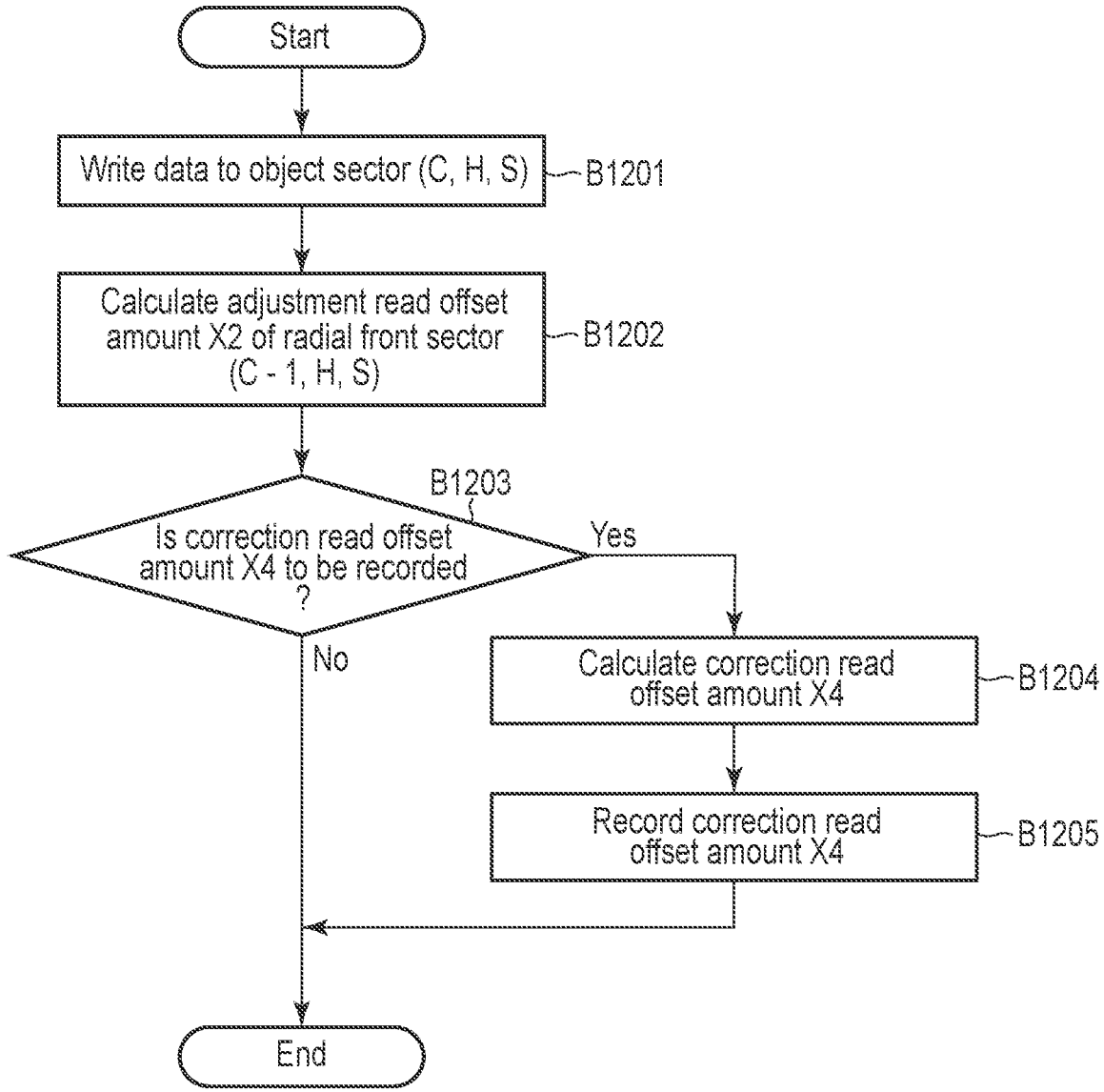
FIG. 12 is a flowchart showing an example of a write processing method according to the first embodiment.

FIG. 12 is a flowchart showing an example of a write processing method according to the present embodiment.

The MPU 60 writes data to the object sector (C, H, S) (B1201). The MPU 60 calculates the adjustment read offset amount X2 of the radial front sector (C−1, H, S) adjacent to the object sector (C, H, S) in the radial direction (B1202). The MPU 60 determines whether to record the correction read offset amount X4 corresponding to the radial front sector (C−1, H, S) (B1203). For example, the MPU 60 determines whether to record the correction read offset amount X4 corresponding to the radial front sector (C−1, H, S) based on the adjustment read offset amount X2 and the read offset threshold value. In other words, the MPU 60 determines whether to correct the target read offset amount corresponding to the radial front sector (C−1, H, S) from the adjustment read offset amount X2 to the correction read offset amount X4 based on the adjustment read offset amount X2. When it is determined not to record the correction read offset amount X4 (NO in B1203), the MPU 60 ends the processing without recording the correction read offset amount X4. In other words, when it is determined not to correct the target read offset amount from the adjustment read offset amount X2 to the correction read offset amount X4, the MPU 60 ends the processing. For example, when it is determined that the adjustment read offset amount X2 is equal to or smaller than the read offset threshold value and it is determined not to record the correction read offset amount X4, the MPU 60 ends the processing without calculating the correction read offset amount X4. In other words, when it is determined that the adjustment read offset amount X2 is equal to or smaller than the read offset threshold value and it is determined not to correct the target read offset amount from the adjustment read offset amount X2 to the correction read offset amount X4, the MPU 60 ends the processing without correcting the target read offset amount from the adjustment read offset amount X2 to the correction read offset amount X4.

When it is determined to record the correction read offset amount X4 (YES in B1203), the MPU 60 calculates (or corrects) the correction read offset amount X4 (B1204). In other words, when it is determined to correct the target read offset amount from the adjustment read offset amount X2 to the correction read offset amount X4, the MPU 60 calculates (or corrects) the correction read offset amount X4. For example, when it is determined that the adjustment read offset amount X2 is larger than the read offset threshold value and it is determined to record the correction read offset amount X4, the MPU 60 calculates (or corrects) the correction read offset amount X4 based on the write position information. In other words, when it is determined that the adjustment read offset amount X2 is larger than the read offset threshold value and it is determined to correct the target read offset amount from the adjustment read offset amount X2 to the correction read offset amount X4, the MPU 60 calculates (or corrects) the target read offset amount from the adjustment read offset amount X2 to the correction read offset amount X4 based on the write position information. The MPU 60 records the radial front sector (C−1, H, S) and the correction read offset amount X4 corresponding to the radial front sector (C−1, H, S) as a table in a particular recording region, for example, the system area 10c of the disk 10 or a non-volatile recording region such as the non-volatile memory 80 (B1205), and ends the processing.

Figure 13:
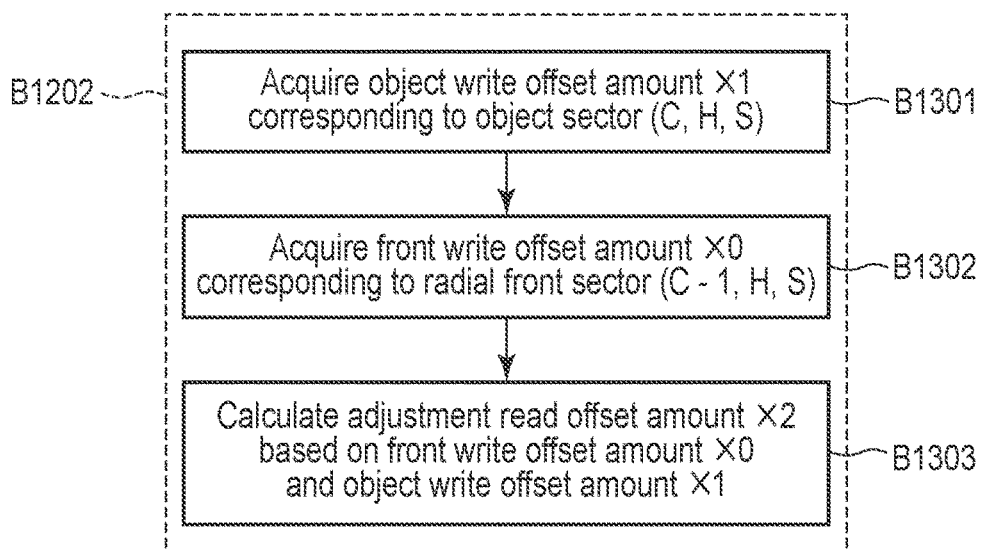
FIG. 13 is a flowchart showing an example of a calculation method for an adjustment read offset amount in FIG. 12.

FIG. 13 is a flowchart showing an example of a calculation method for the adjustment read offset amount X2 in FIG. 12.

In B1202 shown in FIG. 12, the MPU 60 acquires the object write offset amount X1 corresponding to the object sector (C, H, S) (B1301). The MPU 60 acquires the front write offset amount X0 corresponding to the radial front sector (C−1, H, S) from a table stored in a particular recording region, for example, the system area 10c of the disk 10 or a non-volatile recording region such as the non-volatile memory 80 (B1302). The MPU 60 calculates the adjustment read offset amount X2 based on the front write offset amount X0 and the object write offset amount X1 (B1303). For example, the MPU 60 calculates the adjustment read offset amount X2 by halving the sum of the front write offset amount X0 and the object write offset amount X1.

Figure 14:
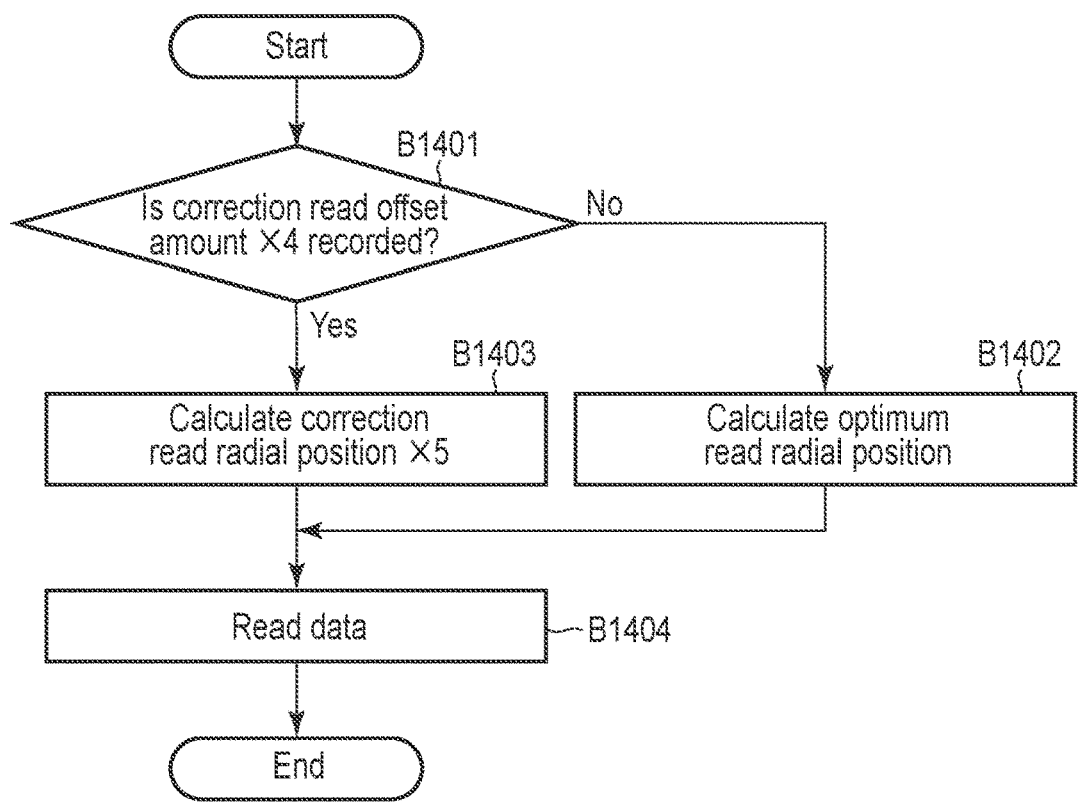
FIG. 14 is a flowchart showing an example of a read processing method according to the first embodiment.

FIG. 14 is a flowchart showing an example of a read processing method according to the present embodiment.

The MPU 60 determines whether or not the correction read offset amount X4 corresponding to the object sector (C, H, S) is recorded in a table stored in a particular recording region, for example, the system area 10c of the disk 10 or a non-volatile recording region such as the non-volatile memory 80 (B1401). When it is determined that the correction read offset amount X4 corresponding to the object sector (C, H, S) is not recorded in the table stored in the particular recording region, for example, the system area 10c of the disk 10 or a non-volatile recording region such as the non-volatile memory 80 (NO in B1401), the MPU 60 calculates the optimum read radial position (B1402) and proceeds to the processing of B1404. When it is determined that the correction read offset amount X4 corresponding to the object sector (C, H, S) is recorded in the table stored in the particular recording region, for example, the system area 10c of the disk 10 or a non-volatile recording region such as the non-volatile memory 80 (YES in B1401), the MPU 60 calculates the correction read radial position X5 (B1403). The MPU 60 controls the head 15 and reads (data of) the object sector (B1404) based on the object read offset amount er which is the difference between the correction read radial position X5 and the actual position Yr, and ends the processing.

According to the present embodiment, when the magnetic disk device 1 writes data to the object sector, the magnetic disk device 1 calculates the adjustment read offset amount X2 of the radial front sector adjacent to the object sector in the radial direction. The magnetic disk device 1 determines whether the adjustment read offset amount X2 is larger than or equal to or smaller than the read offset threshold value. When it is determined that the adjustment read offset amount X2 is larger than the read offset threshold value, the magnetic disk device 1 calculates the correction read offset amount X4 of the radial front sector, and records the correction read offset amount X4 as a table in a particular recording region, for example, the system area 10c of the disk 10 or a non-volatile recording region of the non-volatile memory 80. When the magnetic disk device 1 reads data from the object sector, the magnetic disk device 1 determines whether or not the correction read offset amount X4 corresponding to the object sector is recorded in a table stored in a particular recording region, for example, the system area 10c of the disk 10 or a non-volatile recording region of the non-volatile memory 80. When it is determined that the correction read offset amount X4 corresponding to the object sector is recorded in the table stored in the particular recording region, for example, the system area 10c of the disk 10 or a non-volatile recording region of the non-volatile memory 80, the magnetic disk device 1 controls the head 15 and reads (data of) the object sector based on the inverse code amount er of the object read offset amount which is the difference between the correction read radial position X5 and the actual position Yr. Since the magnetic disk device 1 selectively records the correction read offset amount X4 in a particular recording region, for example, the system area 10c of the disk 10 or a non-volatile recording region such as the non-volatile memory 80, a recording capacity of a recording region, for example, a non-volatile recording region when several correction read offset amounts X4 corresponding to selected sectors are recorded can be made smaller than a recording capacity of a recording region when a plurality of correction read offset amounts X4 corresponding to all the sectors are recorded. Further, the magnetic disk device 1 corrects the target read offset amount from the optimum read offset amount to the correction read offset amount X4 only in the sector corresponding to the correction read offset amount X4 recorded in the particular recording region and reads the sector, so that it is possible to suppress the occurrence of overhead in read processing. Therefore, the magnetic disk device 1 can improve the read performance.

Next, magnetic disk devices according to modified examples of the above-described embodiment will be described. In the modified examples, the same parts as those in the above-described embodiment are designated by the same reference numerals, and detailed description thereof will be omitted.

First Modification Example

A magnetic disk device 1 according to a first modification example is different from the magnetic disk device 1 of the first embodiment described above in the read processing method.

When reading the correction sector, the MPU 60 sets a particular section (which may be hereinafter referred to as a correction section) or duration (which may be hereinafter referred to as a correction duration) including the correction sector in the circumferential direction. The MPU 60 may set a correction section or a correction duration when the correction write offset amount corresponding to the correction sector is calculated at the time of write processing. When reading the correction sector, the MPU 60 calculates (sets or generates) a plurality of correction read offset amounts respectively corresponding to a plurality of non-correction sectors (which may be hereinafter referred to as preliminary correction sectors) that are continuously arranged in the circumferential direction of the correction sector in the correction section or the correction duration. The MPU 60 may calculate (set or generate) the plurality of correction read offset amounts respectively corresponding to the preliminary correction sectors that are continuously arranged in the circumferential direction of the correction sector in the correction section or the correction duration when the correction write offset amount corresponding to the correction sector is calculated at the time of write processing. The correction sector and the preliminary correction sectors are located within the correction section or the correction duration. The correction section is a section corresponding to the correction duration, and the correction duration is a duration corresponding to the correction section. For example, assuming that the tracking band of the positioning control system of the head 15 is about 3 kHz, the correction duration is set to about 150 psec. The correction duration may be other than 150 psec. When reading the correction sector, the MPU 60 generates the plurality of correction read offset amounts respectively corresponding to the plurality of preliminary correction sectors so that the correction sector can be read smoothly. In other words, when reading the correction sector, the MPU 60 generates the plurality of correction read offset amounts respectively corresponding to the plurality of preliminary correction sectors so that the correction read offset amount corresponding to the correction sector and the plurality of correction read offset amounts respectively corresponding to the plurality of preliminary correction sectors are continuous with each other. The MPU 60 may generate the correction read offset amount corresponding to the correction sector. For example, when reading the correction sector, the MPU 60 generates the plurality of correction read offset amounts respectively corresponding to the plurality of preliminary correction sectors that are continuously arranged in the traveling direction from the correction sector so as to be gradually reduced and separated from the correction read offset amount corresponding to the correction sector, and generates the plurality of correction read offset amounts respectively corresponding to the plurality of preliminary correction sectors that are arranged in a direction opposite to the traveling direction from the correction sector so as to be gradually increased and approach the correction read offset amount corresponding to the correction sector.

The MPU 60 may set a large correction duration (or correction section) when the correction read offset amount is large, and may set a small correction duration (or correction section) when the correction read offset amount is small. In other words, the MPU 60 may increase the number of preliminary correction sectors when the correction read offset amount is large, and may decrease the number of preliminary correction sectors when the correction read offset amount is small. Further, the MPU 60 does not need to set the correction duration (or correction section) when the correction read offset amount is smaller than a particular value. In other words, when the correction read offset amount is smaller than a particular value, the MPU 60 sets only the correction read offset amount corresponding to the correction sector without calculating the correction read offset amounts corresponding to the preliminary correction sectors.

When the MPU 60 generates the plurality of correction read offset amounts respectively corresponding to the plurality of preliminary correction sectors, the MPU 60 smoothly reads the plurality of preliminary correction sectors and the correction sector based on the correction read offset amount corresponding to the correction sector and the plurality of correction read offset amounts corresponding to the plurality of preliminary correction sectors.

FIG. 15 is a schematic diagram showing an example of a calculation method for a correction read offset amount X6. In a band region TG14, tracks TR141 and TR142 are overwritten in the forward direction in the stated order. FIG. 15 shows an optimum read path TRT141 corresponding to the track TR141 and an optimum read path TRT142 corresponding to the track TR142. FIG. 15 shows a correction read offset amount X6 (C, S)=X4 (C, S) corresponding to a correction sector (C, S), a correction read offset amount X6 (C, S−3) corresponding to a preliminary correction sector (C, S−3), a correction read offset amount X6 (C, S−2) corresponding to a preliminary correction sector (C, S−2), a correction read offset amount X6 (C, S−1) corresponding to a preliminary correction sector (C, S−1), a correction read offset amount X6 (C, S+1) corresponding to a preliminary correction sector (C, S+1), a correction read offset amount X6 (C, S+2) corresponding to a preliminary correction sector (C, S+2), and a correction read offset amount X6 (C, S+3) corresponding to a preliminary correction sector (C, S+3). The preliminary correction sector (C, S+1) is adjacent to the correction sector (C, S) in the traveling direction. The preliminary correction sector (C, S+2) is adjacent to the preliminary correction sector (C, S+1) in the traveling direction. The preliminary correction sector (C, S+3) is adjacent to the preliminary correction sector (C, S+2) in the traveling direction. The preliminary correction sector (C, S−1) is adjacent to the correction sector (C, S) in the direction opposite to the traveling direction. The preliminary correction sector (C, S−2) is adjacent to the preliminary correction sector (C, S−1) in the direction opposite to the traveling direction. The preliminary correction sector (C, S−3) is adjacent to the preliminary correction sector (C, S−2) in the direction opposite to the traveling direction. The correction sector (C, S), the preliminary correction sector (C, S−1), the preliminary correction sector (C, S−2), the preliminary correction sector (C, S−3), the preliminary correction sector (C, S+1), the preliminary correction sector (C, S+2), and the preliminary correction sector (C, S+3) are located within the correction duration.

The correction read offset amount X6 (C, S−1) is smaller than the correction read offset amount X6 (C, S)=X4 (C, S). The correction read offset amount X6 (C, S−2) is smaller than the correction read offset amount X6 (C, S−1). The correction read offset amount X6 (C, S−3) is larger than 0 and smaller than the correction read offset amount X6 (C, S−2). The correction read offset amount X6 (C, S−3) may be 0. The correction read offset amount X6 (C, S+1) is smaller than the correction read offset amount X6 (C, S)=X4 (C, S). The correction read offset amount X6 (C, S+2) is smaller than the correction read offset amount X6 (C, S+1). The correction read offset amount X6 (C, S+3) is larger than 0 and smaller than the correction read offset amount X6 (C, S+2). The correction read offset amount X6 (C, S+3) may be 0.

When reading the correction sector (C, S), the MPU 60 sets the correction duration (or correction section) so as to include the correction sector (C, S). When reading the correction sector (C, S), the MPU 60 calculates (sets or generates) the correction read offset amounts X6 (C, S−3) to X6 (C, S−1) respectively corresponding to the preliminary correction sectors (C, S−3) to (C, S−1) included in the correction duration (or correction section), and the correction read offset amounts X6 (C, S+1) to X6 (C, S+3) respectively corresponding to the preliminary correction sectors (C, S+1) to (C, S+3) included in the correction duration (or correction section). The MPU 60 reads the preliminary correction sectors (C, S−3) to (C, S−1), the correction sector (C, S), and the preliminary correction sectors (C, S+1) to (C, S+3) based on the correction read offset amounts X6 (C, S−3) to X6 (C, S+3).

FIG. 16 is a block diagram showing an example of the read control system RSY according to the first modification example.

The read control system RSY further includes a generator A21. The generator A21 is included in, for example, the system controller 130, the disk 10, the volatile memory 70, the non-volatile memory 80, and the buffer memory 90. Further, since correction is performed even if the object sector (S) is not necessarily the correction sector, the correction sector recorded in the memory A12 is referred to as (S0) here. In FIG. 16, correction read offset amounts X6 (C, S0−N), . . . , X6 (C, S0), . . . , X6 (C, S0+N) are processed as a signal or information in the read control system RSY.

The generator A21 generates the plurality of correction read offset amounts X6 (C, S0−N), . . . , X6 (C, S0), . . . , X6 (C, S0+N) based on the correction sector (S0) and the correction read offset amount X4 (C, S0) corresponding to this correction sector (S0), and when the object sector (S) matches the sectors (S−N), . . . , (S0), . . . , (S0+N), the generator A21 outputs the corresponding correction read offset amounts X6 (C, S0−N), . . . , X6 (C, S0), . . . , X6 (C, S0+N) as X6 (C, S). Here, N is a positive integer. The sectors (S0−N) to (S0+N) correspond to the sectors arranged in the correction duration or the correction section. The correction read offset amount X6 (C, S0) corresponds to the correction sector. The correction read offset amounts X6 (C, S0−N) to (C, S0−1) and the correction read offset amounts X6 (C, S0+1) to (C, S0+N) correspond to the preliminary correction sectors. The generator A21 outputs the generated correction read offset amount X6 (C, S). Here, as the correction read offset amount X6 (C, S), when the object sector (S) matches the sectors (S0−N), . . . , (S0), . . . , (S0+N), the correction read offset amounts X6 (S0−N), . . . , X6 (S0), . . . , X6 (S0+N) are output.

When the logical position of the disk 10 at which data is read, for example, the LBA is designated by a host device, for example, the host 100, the read control system RSY converts the LBA to the physical position (C, H, S) in advance, and outputs the object sector (C, H, S) to the transducer A0 and the memory A12. Further, the read control system RSY outputs the object sector (S) to the generator A21. The position (C, H, S) is input to the transducer A0. The transducer A0 transduces the position (C, H, S) to the target position (optimum position) Xr and outputs it to the arithmetic unit CL5. Of the position (C, H, S), (C, H) which is information of the cylinder (track) and the head is input to the memory A12. The memory A12 outputs the correction read offset amount X4 (C, S0) and the correction sector number (S0) corresponding to (C, H) which is information of the cylinder (track) and the head of the object sector (C, H, S) to the generator A21. The object sector (S), the correction sector (S0), and the correction read offset amount X4 (C, S0) corresponding to the correction sector (S0) are input to the generator A21. The generator A21 generates the plurality of correction read offset amounts X6 (C, S0−N) to (C, S0+N) respectively corresponding to the correction sector (S0) and the plurality of preliminary correction sectors that are arranged in the circumferential direction of the correction sector (S0) based on the correction sector (S0) and the correction read offset amount X4 corresponding to the correction sector (S0), and when the object sector (S) matches the sectors (S0−N), . . . , (S0), . . . , (S0+N), the generator A21 outputs the corresponding correction read offset amounts X6 (S0−N), . . . , X6 (S0), . . . , X6 (S0+N) as X6 (C, S) to the arithmetic unit CL5.

The target position (optimum position) Xr and the correction read offset amount X6 (C, S) are input to the arithmetic unit CL5. The calculator CL5 calculates the correction read radial position X5 from the sum of the target position (optimum position) Xr and the correction read offset amount X6 (C, S), and outputs the correction read radial position X5 to the arithmetic unit CL1. The correction read radial position X5 and the actual position Yr are input to the arithmetic unit CL1. The arithmetic unit CL1 calculates the inverse code amount er of the object read offset amount from the difference between the correction read radial position X5 and the actual position Yr, and outputs the inverse code amount er of the object read offset amount to the controller A1. The object read offset amount er is input to the controller A1. The controller A1 outputs the drive amount U to the actuator A2. The drive amount U is input to the actuator A2. The actuator A2 is driven according to the drive amount U, and moves the head 15, for example, the read head 15R to the actual position Yr corresponding to the drive amount U. The actuator A2 outputs the actual position Yr to the arithmetic unit CL1.

Figure 17:
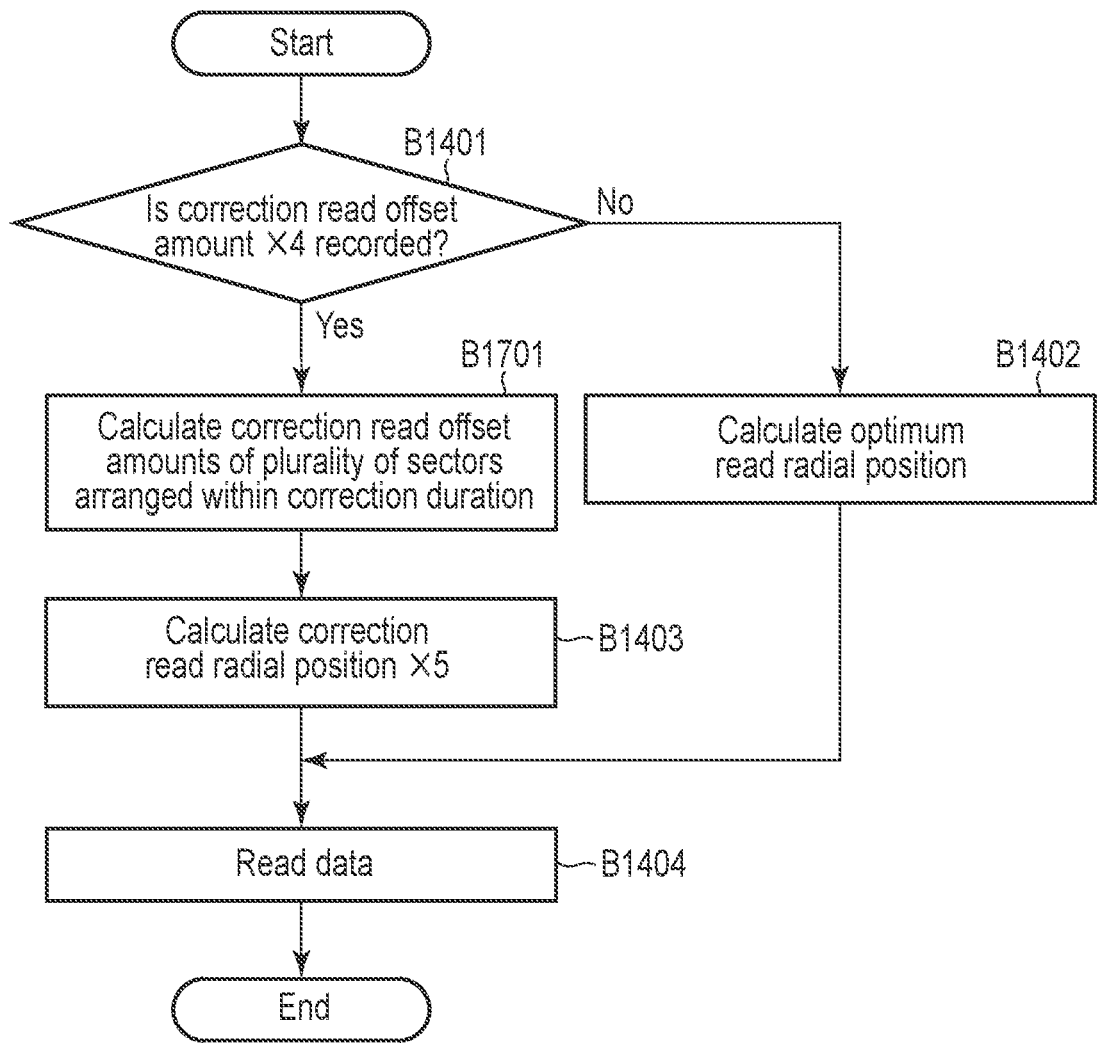
FIG. 17 is a flowchart showing an example of the read processing method according to the first modification example.

FIG. 17 is a flowchart showing an example of the read processing method according to the first modification example.

The MPU 60 determines whether or not the correction read offset amount X4 corresponding to the cylinder (C, H) including the object sector (C, H, S) is recorded in a table stored in a particular recording region, for example, the system area 10c of the disk 10 or the non-volatile memory 80 (B1401). When it is determined that the correction read offset amount X4 corresponding to the cylinder (C, H) including the object sector (C, H, S) is recorded in the table stored in the particular recording region (YES of B1401), the MPU 60 calculates the correction read offset amounts respectively corresponding to the plurality of sectors including the correction sector (C, H, S0) arranged within the correction duration (or correction section) (B1701). In other words, the MPU 60 calculates the plurality of correction read offset amounts respectively corresponding to the correction sector and the plurality of preliminary correction sectors arranged continuously in the circumferential direction of the correction sector. The MPU 60 calculates the correction read radial position X5 based on the correction read offset amount corresponding to the correction sector, the plurality of correction read offset amounts respectively corresponding to the plurality of preliminary correction sectors, and the matching degree between the object sector (C, H, S) and the plurality of correction sectors (B1403). The MPU 60 controls the head 15 and reads (data of) the object sector (B1404) based on the inverse code amount er of the object read offset amount which is the difference between the correction read radial position X5 and the actual position Yr, and ends the processing.

According to the first modification example, when reading the correction sector, the magnetic disk device 1 generates the plurality of correction read offset amounts respectively corresponding to the correction sector and the plurality of preliminary correction sectors arranged continuously in the circumferential direction of the correction sector. The magnetic disk device 1 generates these correction read offset amounts so as to be continuous with each other. The magnetic disk device 1 reads the correction sector and the plurality of preliminary correction sectors based on these correction read offset amounts. Therefore, the magnetic disk device 1 can improve the read performance. When calculating the correction read offset amount corresponding to the correction sector, the magnetic disk device 1 may generate the plurality of correction read offset amounts respectively corresponding to the correction sector and the plurality of preliminary correction sectors arranged continuously in the circumferential direction of the correction sector.

Second Modification Example

A magnetic disk device 1 according to a second modification example is different from the magnetic disk devices 1 of the first embodiment and the first modification example described above in the read processing method.

When the MPU 60 reads the object sector, if the correction sector is arranged in the traveling direction of the object sector, the MPU 60 calculates (sets or generates) a plurality of correction read offset amounts respectively corresponding to the correction sector and the plurality of preliminary correction sectors in the correction section or the correction duration. When the MPU 60 writes the object sector, if the correction sector is arranged in the traveling direction of the object sector, the MPU 60 calculates (sets or generates) the plurality of correction read offset amounts respectively corresponding to the correction sector and the plurality of preliminary correction sectors in the correction section or the correction duration. When the MPU 60 reads the object sector, if the correction sector is arranged in the traveling direction of the object sector, the MPU 60 generates the plurality of correction read offset amounts respectively corresponding to the correction sector and the plurality of preliminary correction sectors so that the correction sector can be read smoothly. In other words, when the MPU 60 reads the object sector, if the correction sector is arranged in the traveling direction of the object sector, the MPU 60 generates the plurality of correction read offset amounts respectively corresponding to the correction sector and the plurality of preliminary correction sectors so that the plurality of correction read offset amounts corresponding to the correction sector and the plurality of preliminary correction sectors are continuous with each other. For example, when the correction sector is located in the traveling direction from the object sector, the MPU 60 generates the plurality of correction read offset amounts respectively corresponding to the correction sector and the plurality of preliminary correction sectors that are continuously arranged in the traveling direction from the object sector so that the correction read offset amount corresponding to the correction sector is the largest. In one example, the MPU 60 generates the plurality of correction read offset amounts respectively corresponding to the correction sector and the plurality of preliminary correction sectors that are continuously arranged in the traveling direction from the object sector in a triangular or sinusoidal shape so that the correction read offset amount corresponding to the correction sector becomes the apex. However, the MPU 60 may generate the plurality of correction read offset amounts respectively corresponding to the correction sector and the plurality of preliminary correction sectors that are continuously arranged in the traveling direction from the object sector in shapes other than the triangular or sinusoidal shape as long as the correction read offset amount corresponding to the correction sector is the largest.

FIG. 18 is a schematic diagram showing an example of the calculation method for the correction read offset amount X6. In a band region TG18, tracks TR181 and TR182 are overwritten in the forward direction in the stated order. FIG. 18 shows an optimum read path TRT181 corresponding to the track TR181 and an optimum read path TRT182 corresponding to the track TR182. FIG. 18 shows a correction read offset amount X6 (C, S) corresponding to a preliminary correction sector (C, S), a correction read offset amount X6 (C, S+1) corresponding to a preliminary correction sector (C, S+1), a correction read offset amount X6 (C, S+d−1) corresponding to a preliminary correction sector (C, S+d−1), a correction read offset amount X6 (C, S+d) corresponding to a correction sector (C, S+d), a correction read offset amount X6 (C, S+d+1) corresponding to a preliminary correction sector (C, S+d+1), and a correction read offset amount X6 (C, S+2d) corresponding to a preliminary correction sector (C, S+2d). The preliminary correction sector (C, S+1) is adjacent to the preliminary correction sector (C, S) in the traveling direction. The preliminary correction sector (C, S+d−1) is located in the traveling direction of the preliminary correction sector (C, S+1). The correction sector (C, S+d) is adjacent to the preliminary correction sector (C, S+d−1) in the traveling direction. The preliminary correction sector (C, S+d+1) is adjacent to the correction sector (C, S) in the traveling direction. The preliminary correction sector (C, S+2d) is located in the traveling direction of the preliminary correction sector (C, S+d+1). The preliminary correction sectors (C, S) to (C, S+d−1), the correction sectors (C, S+d), and the preliminary correction sectors (C, S+d+1) to (C, S+2d) are located within the correction duration.

The correction read offset amount X6 (C, S+1) is larger than the correction read offset amount X6 (C, S). The correction read offset amount X6 (C, S) may be 0. The correction read offset amount X6 (C, S+d−1) is larger than the correction read offset amount X6 (C, ++1). The correction read offset amount X6 (C, S+d)=X4 (C, S+d) is larger than the correction read offset amount X6 (C, S+d+1). The correction read offset amount X6 (C, S+d+1) is smaller than the correction read offset amount X6 (C, S+d). The correction read offset amount X6 (C, S+2d) is smaller than the correction read offset amount X6 (C, S+d+1). The correction read offset amount X6 (C, S+2d) may be 0.

When the MPU 60 reads the object sector (C, S), if the correction sector is arranged in the traveling direction of the object sector (C, S), the MPU 60 sets the correction duration (or correction section) so as to include the correction section (C, S). When reading the object sector (C, S), the MPU 60 calculates (sets or generates) the correction read offset amounts X6 (C, S) to X6 (C, S+d−1) respectively corresponding to the preliminary correction sector (object sector) (C, S) to the preliminary correction sector (C, S+d−1) included in the correction duration (or correction section), and the correction read offset amounts X6 (C, S+d+1) to X6 (C, S+2d) respectively corresponding to the preliminary correction sectors (C, S+d+1) to (C, S+2d) included in the correction duration (or correction section). The MPU 60 reads the preliminary correction sectors (C, S) to (C, S+d−1), the correction sector (C, S+d), and the preliminary correction sectors (C, S+d+1) to (C, S+2d) based on the correction read offset amounts X6 (C, S) to X6 (C, S+2d).

According to the second modification example, when the magnetic disk device 1 reads the object sector, if the correction sector is arranged in the traveling direction of the object sector, the magnetic disk device 1 generates the plurality of read offset amounts respectively corresponding to the correction sector and the plurality of preliminary correction sectors. The magnetic disk device 1 generates these correction read offset amounts so as to be continuous with each other. The magnetic disk device 1 reads the correction sector and the plurality of preliminary correction sectors based on these correction read offset amounts. Therefore, the magnetic disk device 1 can improve the read performance. When the magnetic disk device 1 writes the object sector, if the correction sector is arranged in the traveling direction of the object sector, the magnetic disk device 1 may generate the plurality of read offset amounts respectively corresponding to the correction sector and the plurality of preliminary correction sectors.

Third Modification Example

A magnetic disk device 1 according to a third modification example is different from those of the first embodiment, the first modification example, and the second modification example described above in the read processing method.

The MPU 60 determines whether or not two correction sectors are arranged within a particular range (which may be hereinafter referred to as a proximity range). The proximity range is, for example, a range in the circumferential direction in which the head 15 cannot move (or change direction) from a sector located at a particular radial position to a sector located at a particular radial position on the opposite side of this sector across the optimum write path. When the MPU 60 determines that the two correction sectors are arranged within the proximity range, the MPU 60 determines whether the correction read offset amount corresponding to the particular correction sector and the correction read offset amount corresponding to the other correction sector are on the opposite sides or the same side in the radial direction. When it is determined that the correction read offset amount corresponding to the particular correction sector and the correction read offset amount corresponding to the other correction sector are on the sides opposite to each other in the radial direction, the MPU 60 compares the absolute value of the correction read offset amount corresponding to the particular correction sector and the absolute value of the correction read offset amount corresponding to the other correction sector. The MPU 60 sets only the correction read offset amount of the larger one of the absolute value of the correction read offset amount corresponding to the particular correction sector and the absolute value of the correction read offset amount corresponding to the other correction sector. In other words, when the correction read offset amount corresponding to the particular correction sector and the correction read offset amount corresponding to the other correction sector are on the sides opposite to each other in the radial direction, the MPU 60 ignores the correction read offset amount of the smaller one of the absolute value of the correction read offset amount corresponding to the particular correction sector and the absolute value of the correction read offset amount corresponding to the other correction sector. For example, when the correction read offset amount corresponding to the particular correction sector is an offset amount in the outward direction and the correction read offset amount corresponding to the other correction sector is an offset amount in the inward direction, the MPU 60 sets only the correction read offset amount of the larger one of the absolute value of the correction read offset amount corresponding to the particular correction sector and the absolute value of the correction read offset amount corresponding to the other correction sector.

When the two correction sectors are arranged within the proximity range, the MPU 60 reads the sectors from the particular correction sector to the other correction sector based on the correction read offset amount of the larger one of the absolute value of the correction read offset amount corresponding to the particular correction sector and the absolute value of the correction read offset amount corresponding to the other correction sector.

The MPU 60 determines whether or not the two correction sectors are arranged within the proximity range. When the MPU 60 determines that the two correction sectors are arranged within the proximity range, the MPU 60 determines whether the correction read offset amount corresponding to the particular correction sector and the correction read offset amount corresponding to the other correction sector are on the opposite sides or the same side in the radial direction. When it is determined that the correction read offset amount corresponding to the particular correction sector and the correction read offset amount corresponding to the other correction sector are on the sides opposite to each other in the radial direction, the MPU 60 calculates (sets or generates) a read offset amount (which may be hereinafter referred to as an average correction read offset amount) corresponding to the particular correction sector and an average correction read offset amount corresponding to the other correction sector so as to attain a moving average between the correction read offset amount corresponding to the particular correction sector and the correction read offset amount corresponding to the other correction sector based on the correction read offset amount corresponding to the particular correction sector and the correction read offset amount corresponding to the other correction sector. For example, when the correction read offset amount corresponding to the particular correction sector is an offset amount in the outward direction and the correction read offset amount corresponding to the other correction sector is an offset amount in the inward direction, the MPU 60 calculates (sets or generates) the average correction read offset amount corresponding to the particular correction sector and the average correction read offset amount corresponding to the other correction sector so as to attain the moving average between the correction read offset amount corresponding to the particular correction sector and the correction read offset amount corresponding to the other correction sector.

When the two correction sectors are arranged within the proximity range, the MPU 60 reads the sectors from the particular correction sector to the other correction sector based on the average correction read offset amount corresponding to the particular correction sector and the average correction read offset amount corresponding to the other correction sector.

Figure 19:
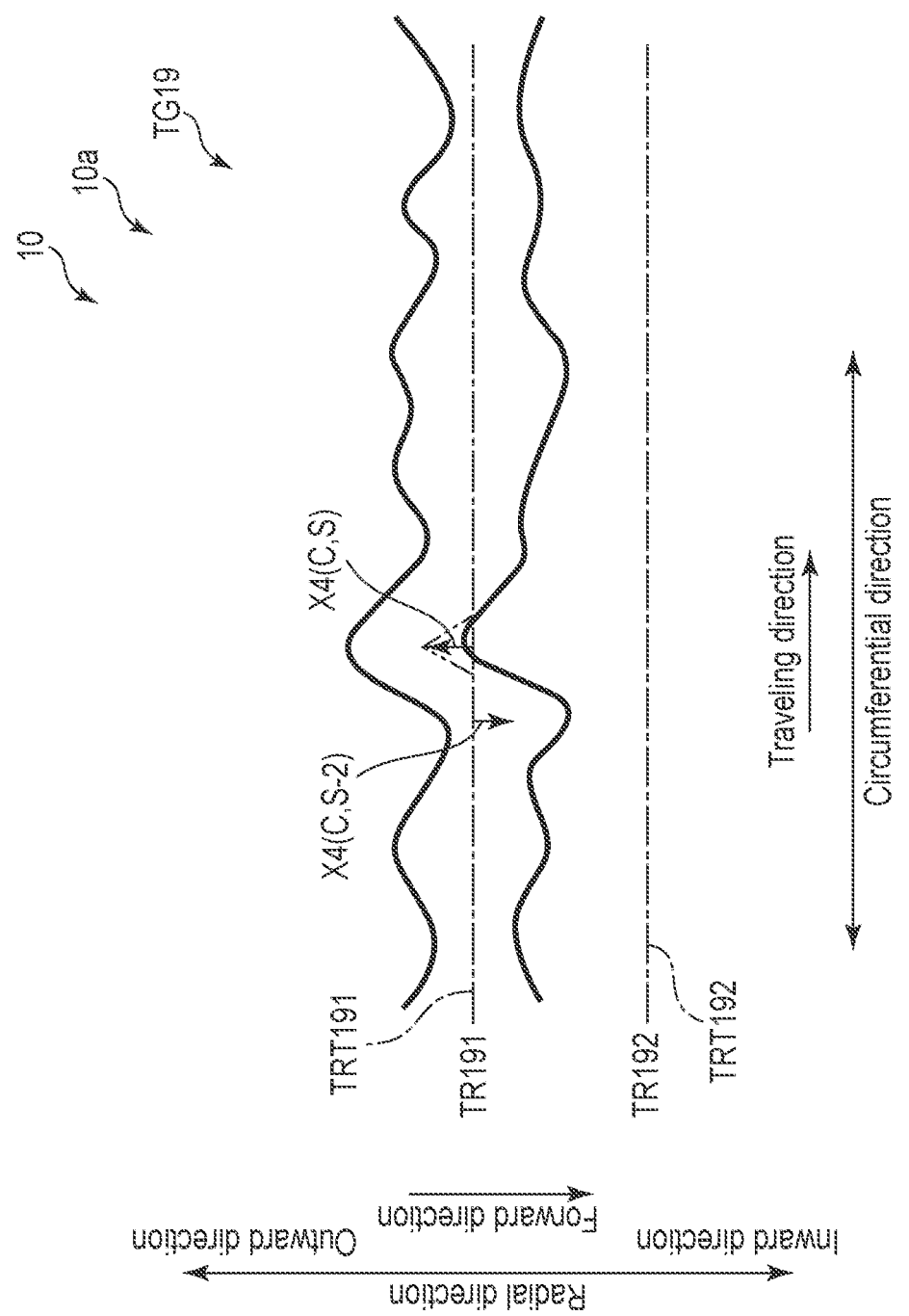
FIG. 19 is a schematic diagram showing an example of a setting method for a correction read offset amount.

FIG. 19 is a schematic diagram showing an example of a setting method for the correction read offset amount X4. In a band region TG19, tracks TR191 and TR192 are overwritten in the forward direction in the stated order. FIG. 19 shows an optimum read path TRT191 corresponding to the track TR191 and an optimum read path TRT192 corresponding to the track TR192. FIG. 19 shows a correction read offset amount X4 (C, S–2) corresponding to a correction sector (C, S–2) and a correction read offset amount X4 (C, S) corresponding to a correction sector (C, S). The correction sector (C, S) is located in the traveling direction of the correction sector (C, S–2). The correction sector (C, S–2) and the correction sector (C, S) are arranged within the proximity range. The correction read offset amount X4 (C, S) is larger than the correction read offset amount X4 (C, S–2).

When the MPU 60 determines that the correction sector (C, S–2) and the correction sector (C, S) are arranged within the proximity range, the MPU 60 compares the absolute value of the correction read offset amount X4 (C, S–2) and the absolute value of the correction read offset amount X4 (C, S). When the MPU 60 determines that the absolute value of the correction read offset amount X4 (C, S) is larger than the absolute value of the correction read offset amount X4 (C, S–2), the MPU 60 sets only the correction read offset amount X4 (C, S). The MPU 60 reads the correction sector (C, S) based on the correction read offset amount X4 (C, S). That is, the MPU 60 reads the correction sector (C, S–2) according to the optimum read path TRT1 and reads the correction sector (C, S) by shifting by the correction read offset amount X4 (C, S) in the radial direction.

Figure 20:
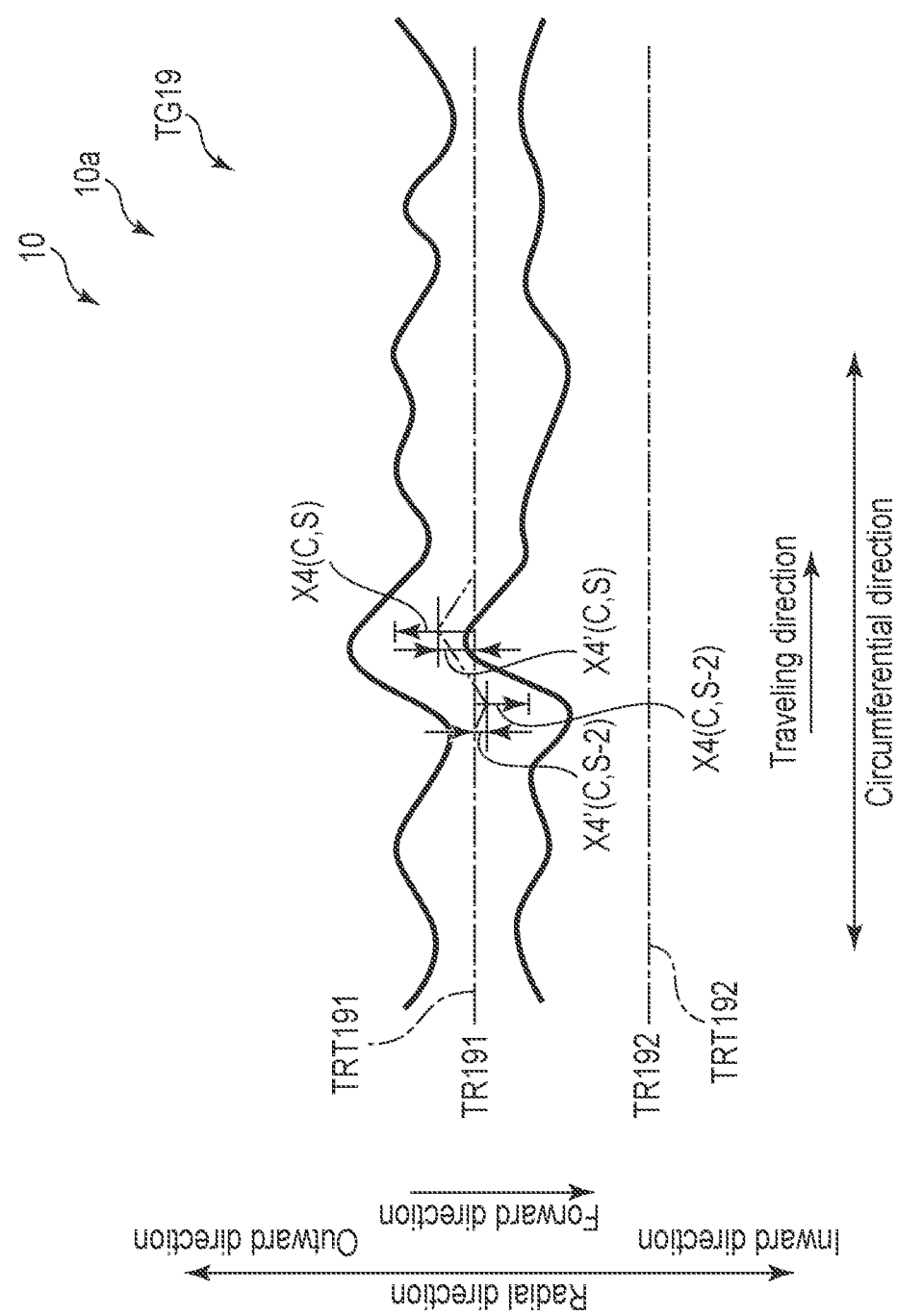
FIG. 20 is a schematic diagram showing an example of a calculation method for an average correction read offset amount.

FIG. 20 is a schematic diagram showing an example of a calculation method for an average correction read offset amount X4. FIG. 20 shows an average correction read offset amount X4' (C, S–2) corresponding to a correction sector (C, S–2) and an average correction read offset amount X4' (C, S) corresponding to a correction sector (C, S). For example, the average correction read offset amount X4' (C, S–2) is smaller than the correction read offset amount X4 (C, S–2), and the average correction read offset amount X4' (C, S) is smaller than the correction read offset amount X4 (C, S).

When the correction sector (C, S–2) and the correction sector (C, 2) are arranged within the proximity range, the MPU 60 calculates the average correction read offset amount X4' (C, S–2) corresponding to the correction sector (C, S–2) and the average correction read offset amount X4' (C, S) corresponding to the correction sector (C, S) so as to attain a moving average between the correction read offset amount X4 (C, S–2) and the correction read offset amount X4 (C, S) based on the correction read offset amount X4 (C, S–2) corresponding to the correction sector (C, S–2) and the correction read offset amount X4 (C, S) corresponding to the correction sector (C, S). The MPU 60 reads the sectors from the correction sector (C, S–2) to the correction sector (C, S) based on the average correction read offset amount X4' (C, S–2) and the average correction read offset amount X4' (C, S). That is, the MPU 60 reads the correction sector (C, S–2) based on the average correction read offset amount X4' (C, S–2) and reads the correction sector (C, S) based on the average correction read offset amount X4' (C, S).

According to the third modification example, when the magnetic disk device 1 determines that the two correction sectors are arranged within the proximity range, the magnetic disk device 1 reads the sectors from the particular correction sector to the other correction sector based on the correction read offset amount of the larger one of the absolute value of the correction read offset amount corresponding to the particular correction sector and the absolute value of the correction read offset amount corresponding to the other correction sector. Further, when the two correction sectors are arranged within the proximity range, the magnetic disk device 1 reads the sectors from the particular correction sector to the other correction sector based on the average correction read offset amount corresponding to the particular correction sector and the average correction read offset amount corresponding to the other correction sector. Therefore, the magnetic disk device 1 can improve the read performance.

In the embodiment and the modification examples described above, the example in which the tracks are written by shingled magnetic recording is shown, but the configurations of the embodiment and the modification examples described above can also be applied to the case where the tracks are written by normal recording.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a first sector arranged at a first radial position deviated from a target position in a radial direction by a first offset amount larger than a first threshold value;
a head that writes data to the disk and reads data from the disk; and
a controller that reads the first sector by arranging the head at a second radial position deviated from the target position by a second offset amount different from the first offset amount,
wherein the disk includes a second sector arranged at a third radial position deviated from the target position in the radial direction by a third offset amount which is equal to or smaller than the first threshold value, and
the controller arranges the head at the target position and reads the second sector.

2. The magnetic disk device according to claim 1, wherein the second offset amount is smaller than the first offset amount.

3. The magnetic disk device according to claim 2, wherein the first sector and the second sector are arranged so that an error rate occurring when the head performs a read at a position deviated from the second radial position by a maximum positioning error is lower than or equal to a first error rate.

4. The magnetic disk device according to claim 3, wherein the first threshold value corresponds to a difference value between a first range from the target position to the third radial position corresponding to the first error rate, and a second range from the target position to a fourth radial position corresponding to a maximum value in one direction within the positioning error.

5. The magnetic disk device according to claim 3, wherein the second offset amount corresponds to a value obtained by subtracting the first threshold value from the first offset amount.

6. The magnetic disk device according to claim 1, wherein the controller arranges the head at a fourth radial position deviated from the target position by a fourth offset amount smaller than the second offset amount and reads a third sector adjacent to the first sector in a circumferential direction of the disk.

7. The magnetic disk device according to claim 1, wherein, when a third sector arranged in a circumferential direction of the disk with respect to the first sector is arranged at a fourth radial position deviated from the target position in a direction opposite to the first sector in the radial direction by a fourth offset amount which is larger than the first threshold value and smaller than the first offset amount, the controller arranges the head at the first radial position and reads the first sector, and arranges the head at the target position and reads the third sector.

8. The magnetic disk device according to claim 1, wherein, when a third sector arranged in a circumferential direction of the disk with respect to the first sector is arranged at a fourth radial position deviated from the target position in a direction opposite to the first sector in the radial direction by a fourth offset amount which is larger than the first threshold value, the controller reads the first sector and the third sector according to a path that is a moving average of the first offset amount and the fourth offset amount.

9. The magnetic disk device according to claim 1, wherein, when the controller determines that the first offset amount is larger than the first threshold value, the controller calculates the second offset amount and records the second offset amount in a recording region.

10. The magnetic disk device according to claim 9, wherein, when reading the first sector, the controller determines whether or not the second offset amount is recorded in the recording region, and when determining that the second offset amount is recorded in the recording region, the controller arranges the head at the second radial position and reads the first sector.

11. A read processing method, which is applied to a magnetic disk device including a disk including a first sector arranged at a first radial position deviated from a target position in a radial direction by a first offset amount larger than a first threshold value and a second sector arranged at a third radial position deviated from the target position in the radial direction by a third offset amount which is equal to or smaller than the first threshold value, and a head that writes data to the disk and reads data from the disk, the read processing method comprising:
arranging the head at a second radial position deviated from the target position from the target position by a second offset amount different from the first offset amount, and reading the first sector, and
arranging the head at the target position and reading the second sector.

12. The read processing method according to claim 11, wherein the second offset amount is smaller than the first offset amount.

13. The read processing method according to claim 12, wherein the first sector and the second sector are arranged so that an error rate occurring when the head performs a read at a position deviated from the second radial position by a maximum positioning error is lower than or equal to a first error rate.

14. The read processing method according to claim 13, wherein the first threshold value corresponds to a difference value between a first range from the target position to the third radial position corresponding to the first error rate, and a second range from the target position to a fourth radial position corresponding to a maximum value in one direction within the positioning error.

15. The read processing method according to claim 13, wherein the second offset amount corresponds to a value obtained by subtracting the first threshold value from the first offset amount.

16. The read processing method according to claim 11, further comprising:
arranging the head at a fourth radial position deviated from the target position by a fourth offset amount smaller than the second offset amount, and reading a third sector adjacent to the first sector in a circumferential direction of the disk.

17. The read processing method according to claim 11, further comprising:
arranging the head at the first radial position and reading the first sector when a third sector arranged in a circumferential direction of the disk with respect to the first sector is arranged at a fourth radial position deviated from the target position in a direction opposite to the first sector in the radial direction by a fourth offset amount which is larger than the first threshold value and smaller than the first offset amount; and
arranging the head at the target position and reading the third sector.

18. The read processing method according to claim 11, further comprising:
reading the first sector and the third sector according to a path that is a moving average of the first offset amount and a fourth offset amount when a third sector arranged in a circumferential direction of the disk with respect to the first sector is arranged at a fourth radial position deviated from the target position in a direction opposite to the first sector in the radial direction by the fourth offset amount which is larger than the first threshold value.

* * * * *